US011689905B2

(12) United States Patent
Rajagopal et al.

(10) Patent No.: US 11,689,905 B2
(45) Date of Patent: Jun. 27, 2023

(54) METHOD AND APPARATUS FOR TRANSMISSION OF CONTROL AND DATA IN VEHICLE TO VEHICLE COMMUNICATION

(71) Applicant: Samsung Electronics Co., Ltd., Suwon-si (KR)

(72) Inventors: Sridhar Rajagopal, Plano, TX (US); Aris Papasakellariou, Houston, TX (US); Thomas David Novlan, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 16/708,121

(22) Filed: Dec. 9, 2019

(65) Prior Publication Data
US 2020/0120466 A1 Apr. 16, 2020

Related U.S. Application Data

(63) Continuation of application No. 15/469,428, filed on Mar. 24, 2017, now Pat. No. 10,506,402.
(Continued)

(51) Int. Cl.
*H04W 4/70* (2018.01)
*H04L 67/12* (2022.01)
(Continued)

(52) U.S. Cl.
CPC ............ *H04W 4/70* (2018.02); *H04L 5/0007* (2013.01); *H04L 5/0033* (2013.01);
(Continued)

(58) Field of Classification Search
CPC ........ H04L 67/12; H04W 4/005; H04W 4/70; H04W 72/042
See application file for complete search history.

(56) References Cited

U.S. PATENT DOCUMENTS 10,582,552 B2   3/2020  Kim et al.
2011/0103327 A1*  5/2011  Lee ...................... H04W 48/12
                                                370/329
(Continued)

FOREIGN PATENT DOCUMENTS

WO   2016028126 A1   2/2016

OTHER PUBLICATIONS

European Patent Office, "Supplementary Partial European Search Report," Application No. EP17775861.2, dated Sep. 27, 2019, 16 pages.
(Continued)

*Primary Examiner* — Syed Ali
*Assistant Examiner* — Zhaohui Yang

(57) ABSTRACT

A user equipment (UE) and base station (BS) in a wireless communication network. The UE includes a receiver configured to receive at least one semi-persistent scheduling (SPS) configuration among a plurality of SPS configurations from a BS. Each of the SPS configurations configures the UE with a different periodicity of a sidelink transmission to be transmitted to another UE. The UE also includes a transmitter configured to transmit the sidelink transmission in the different periodicity according to the at least one of the plurality of SPS configurations. The BS includes a controller configured to select at least one SPS configuration among a plurality of SPS configurations for a UE. Each of the SPS configurations configures the UE with a different periodicity of a sidelink transmission to be transmitted to another UE. The BS also includes a transmitter configured to transmit the selected at least one SPS configuration to the UE.

6 Claims, 30 Drawing Sheets

Related U.S. Application Data

(60) Provisional application No. 62/335,368, filed on May 12, 2016, provisional application No. 62/334,179, filed on May 10, 2016, provisional application No. 62/333,512, filed on May 9, 2016, provisional application No. 62/320,128, filed on Apr. 8, 2016, provisional application No. 62/316,182, filed on Mar. 31, 2016.

(51) Int. Cl.
| | |
|---|---|
| *H04L 5/00* | (2006.01) |
| *H04W 72/23* | (2023.01) |
| *H04L 5/16* | (2006.01) |
| *H04W 4/40* | (2018.01) |
| *H04W 4/80* | (2018.01) |

(52) U.S. Cl.
CPC .......... *H04L 5/0053* (2013.01); *H04L 5/0082* (2013.01); *H04L 5/0087* (2013.01); *H04L 5/0096* (2013.01); *H04L 67/12* (2013.01); *H04W 72/23* (2023.01); *H04L 5/0044* (2013.01); *H04L 5/0064* (2013.01); *H04L 5/0069* (2013.01); *H04L 5/16* (2013.01); *H04W 4/40* (2018.02); *H04W 4/80* (2018.02)

(56) References Cited

U.S. PATENT DOCUMENTS

| | | | | |
|---|---|---|---|---|
| 2015/0223213 | A1* | 8/2015 | Moon | H04W 52/40 370/329 |
| 2018/0227943 | A1* | 8/2018 | Xiao | H04W 76/23 |
| 2018/0338319 | A1* | 11/2018 | Kim | H04W 72/044 |
| 2019/0045507 | A1* | 2/2019 | Sorrentino | H04W 72/042 |
| 2020/0337067 | A1* | 10/2020 | Chae | H04W 72/1278 |

OTHER PUBLICATIONS

Ericsson, "Discussion on Uu Enhancements for V2X," Tdoc R2-161565, 3GPP TSG-RAN WG2 #93, Malta, Feb. 15-19, 2016, 8 pages.

Huawei, et al., "Enhancement on Mode 1," R1-160282, 3GPP TSG RAN WG1 Meeting #84, St. Julian's, Malta, Feb. 15-19, 3 pages.

ZTE, "D2D communication resource mode configuration," R2-142146, 3GPP TSG-RAN WG2 Meeting #86, Seoul, South Korea, May 19-23, 2014, 5 pages.

Panasonic, "Discussion on SPS mechanism supported in V2V", 3GPP TSG RAN WG1 Meeting #84, Feb. 15-19, 2016, R1-160722, 3 pages.

Nusrat Afrin et al., "Performance Evaluation of an Adaptive Semi-persistent LTE Packet Scheduler for M2M Communications", 2014 8th International Conference on Signal Processing and Communication Systems (ICSPCS), Dec. 15, 2014, 7 pages.

Catt, "Further discussion on resource allocation mechanism in PC5-based V2V", 3GPP TSG RAN WG1 Meeting #83, Nov. 15-22, 2015, R1-157449, 10 pages.

ZTE, "Resource pool allocation enhancement for V2V", 3GPP TSG-RAN WG1 Meeting #84, Feb. 15-19, 2016, R1-160682, 6 pages.

ZTE, "Enhancement of resource allocation and procedure for V2V", 3GPP TSG-RAN WG1 Meeting #83, Nov. 15-22, 2015, R1-156659, 8 pages.

NEC, "Enhancement to resource pool structure of PC5-based V2V", 3GPP TSG-RAN WG1 Meeting #84, Feb. 15-19, 2016, R1-160394, 4 pages.

Supplementary European Search Report dated Feb. 28, 2020 in connection with European Patent Application No. 17 77 5861, 22 pages.

Office Action in connection with Korean Application No. 10-2018-7028127 dated Dec. 22, 2020, 10 pages.

* cited by examiner

METHOD AND APPARATUS FOR TRANSMISSION OF CONTROL AND DATA IN VEHICLE TO VEHICLE COMMUNICATION

CROSS-REFERENCE TO RELATED APPLICATION AND CLAIMS OF PRIORITY

This application is a continuation of U.S. patent application Ser. No. 15/469,428, filed Mar. 24, 2017, which claims the benefit under 35 U.S.C. § 119(e) of: U.S. Provisional Patent Application No. 62/316,182 filed on Mar. 31, 2016; U.S. Provisional Patent Application No. 62/320,128 filed on Apr. 8, 2016; U.S. Provisional Patent Application No. 62/333,512 filed on May 9, 2016; U.S. Provisional Patent Application No. 62/334,179 filed on May 10, 2016; and U.S. Provisional Patent Application No. 62/335,368 filed on May 12, 2016. The above-identified provisional patent applications are hereby incorporated by reference in their entirety.

TECHNICAL FIELD

The present invention relates generally to wireless communication systems and, more specifically, to communication network protocols, including vehicle-to-device, vehicle-to-vehicle, and vehicle-to-network communication resource allocation and synchronization methods.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented to utilize only device-to-device (D2D) communication links without a need for fixed infrastructure components. This type of network is typically referred to as an ad-hoc network. A hybrid communication network can support devices that connect both to fixed infrastructure components and to other D2D-enabled devices. While end user devices such as smartphones may be envisioned for D2D communication networks, a vehicular communication network, such as vehicle to everything (V2X) may be supported by a communication protocol where vehicles exchange control and data information between other vehicles (vehicle to vehicle (V2V)) or other infrastructure (vehicle to infrastructure (V2I)) and end-user devices (vehicle to pedestrian (V2P)). Multiple types of communication links may be supported by nodes providing V2X communication in a network, and utilizing the same or different protocols and systems.

SUMMARY

Various embodiments of the present disclosure provide methods and apparatuses for the transmission of control and data in vehicle to vehicle communication.

In a first embodiment, a user equipment (UE) in a wireless communication network includes a receiver configured to receive at least one semi-persistent scheduling (SPS) configuration among a plurality of SPS configurations from a base station. Each of the plurality of SPS configurations configures the UE with a different periodicity of a sidelink transmission to be transmitted to another UE. The UE also includes a transmitter configured to transmit the sidelink transmission in the different periodicity according to the at least one received SPS configuration.

In a second embodiment, a BS in a wireless communication network includes a controller configured to select at least one SPS configuration among a plurality of SPS configurations for a UE. Each of the plurality of SPS configurations configures the UE with a different periodicity of a sidelink transmission to be transmitted to another UE. The BS also includes a transmitter configured to transmit the selected at least one SPS configuration to the UE.

In a third embodiment, a method for operating a UE in a wireless communication network comprises receiving at least one semi-persistent scheduling (SPS) configuration among a plurality of SPS configurations from a base station. Each of the plurality of SPS configurations configures the UE with a different periodicity of a sidelink transmission to be transmitted to another UE. The method further includes transmitting the sidelink transmission with a periodicity according to the at least one received SPS configuration.

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein:

3rd generation partnership project (3GPP) TS 36.211 v13.0, "E-UTRA, Physical channels and modulation" ("REF 1"); 3GPP TS 36.212 v13.0, "E-UTRA, Multiplexing and Channel coding" ("REF 2"); 3GPP TS 36.213 v13.0, "E-UTRA, Physical Layer Procedures" ("REF 3"); 3GPP TS 36.321 v13.0, "E-UTRA, Medium Access Control (MAC)

protocol specification" ("REF 4"); 3GPP TS 36.331 v13.0, "E-UTRA, Radio Resource Control (RRC) Protocol Specification" ("REF 5"); 3GPP TS 23.303 v13.2.0, "Proximity-based services (ProSe); Stage 2" ("REF 6"); 3GPP TS 22.885 v14.0.0, "Study on LTE support for V2X services" ("REF 7"); and R1-161527, "Observations on CAM message periodicity and payload," Ericsson ("REF 8").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
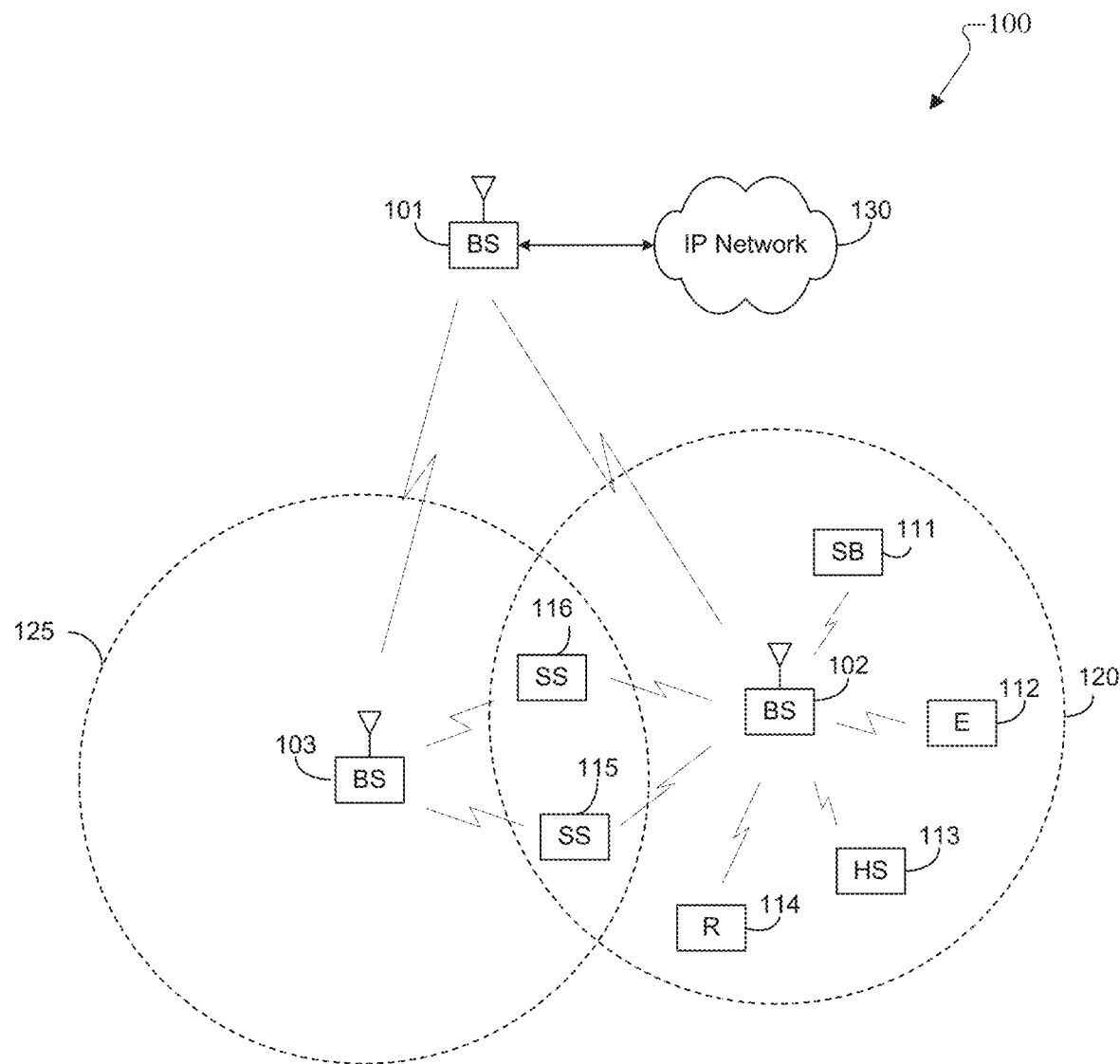
FIG. 1 illustrates an example wireless network according to some embodiments of the present disclosure.

FIG. 1 illustrates an example wireless network 100 according to some embodiments of the present disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the transmission of control and data in vehicle to vehicle communication.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
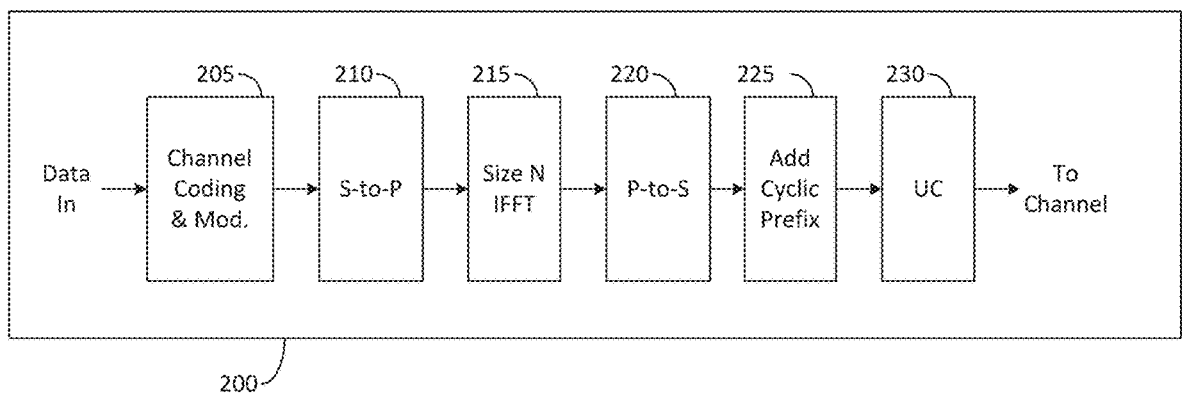
FIGS. 2A and 2B illustrate example wireless transmit and receive paths according to some embodiments of the present disclosure.
Figure 2B:
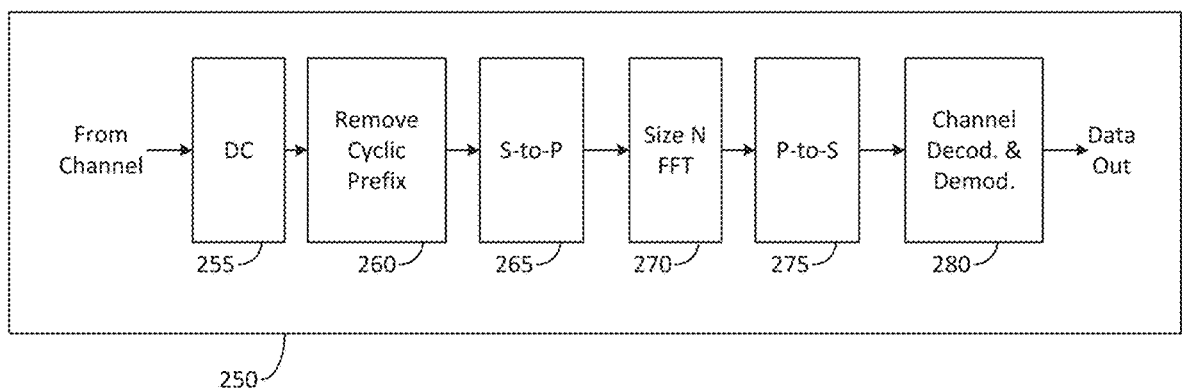

FIGS. 2A and 2B illustrate example wireless transmit and receive paths according to some embodiments of the present disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the transmission of control and data in vehicle to vehicle communication.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
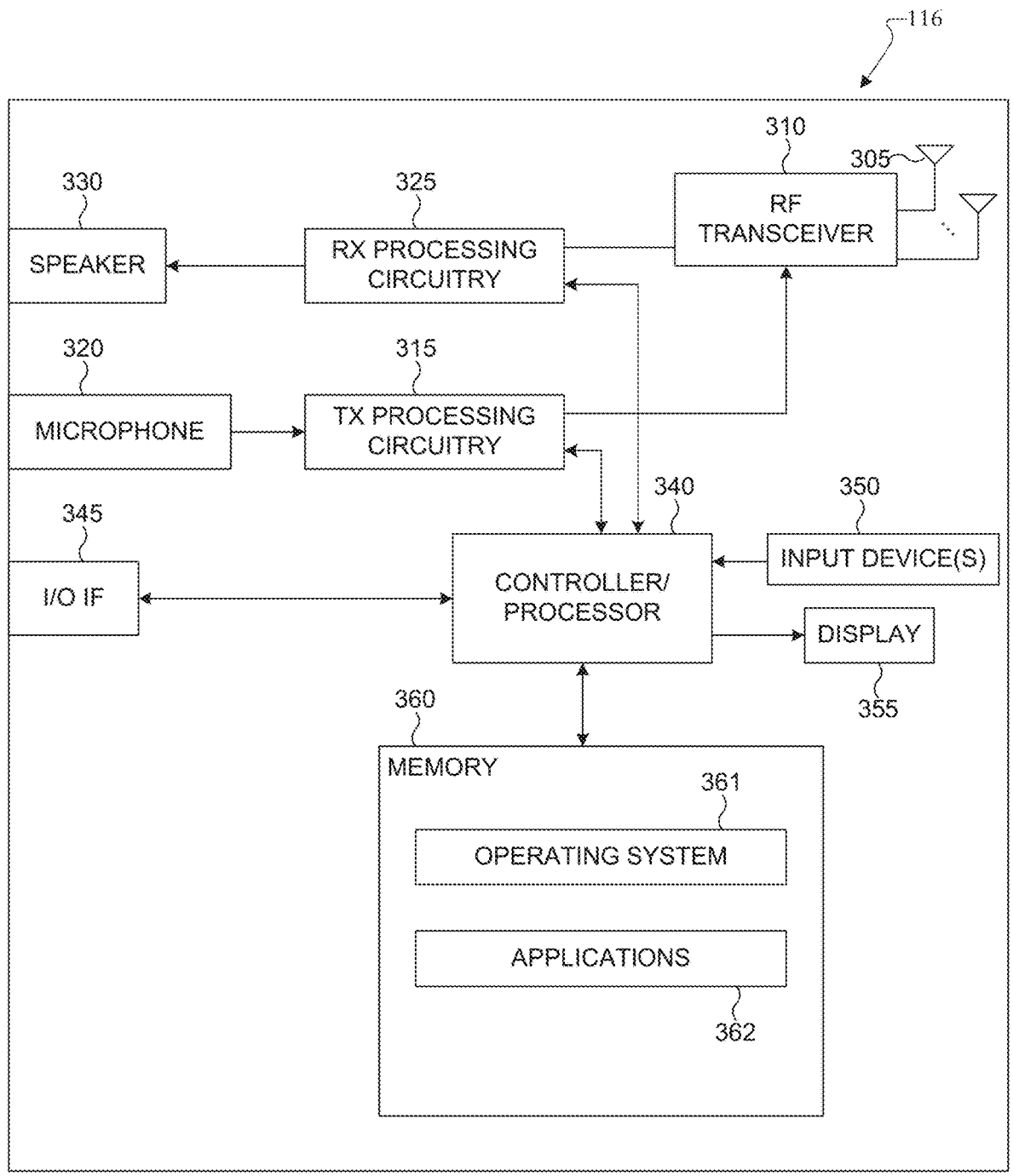
FIG. 3A illustrates an example user equipment according to some embodiments of the present disclosure.

FIG. 3A illustrates an example UE 116 according to some embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
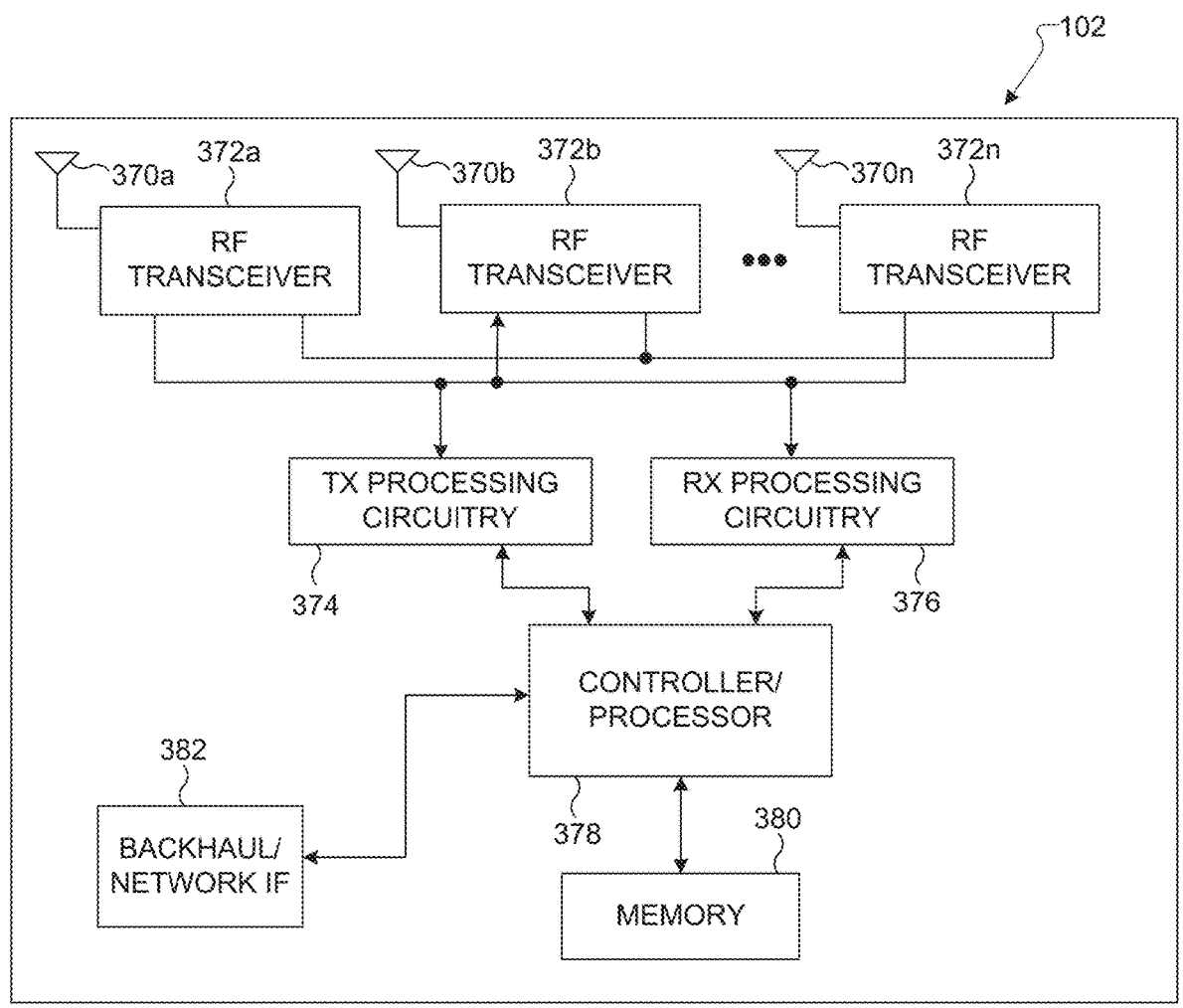
FIG. 3B illustrates an example enhanced NodeB (eNB) according to some embodiments of the present disclosure.

FIG. 3B illustrates an example eNB 102 according to some embodiments of the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNB s. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting the transmission of control and data in vehicle to vehicle communication as described in embodiments of the present disclosure. In some embodiments, the controller/processor 378 supports communications between entities, such as web Real-Time Communication (RTC). The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

A communication system includes a downlink (DL) that conveys signals from transmission points such as base stations or eNBs to UEs and an uplink (UL) that conveys signals from UEs to reception points such as eNBs. A UE, also commonly referred to as a terminal or a mobile station, may be fixed or mobile and may be a cellular phone, a personal computer device, or an automated device. An eNB, which is generally a fixed station, may also be referred to as an access point or other equivalent terminology.

DL signals include data signals conveying information content, control signals conveying DL control information (DCI), and reference signals (RS) that are also known as pilot signals. An eNB transmits data information or DCI through respective physical DL shared channels (PDSCHs) or physical DL control channels (PDCCHs). The PDCCH can be an enhanced PDCCH (EPDDCH) but the term PDCCH will be used for brevity to denote PDCCH or EPDCCH. A PDCCH is transmitted over one or more control channel elements (CCEs). An eNB transmits one or more of multiple types of RS including a UE-common RS (CRS), a channel state information RS (CSI-RS), and a demodulation RS (DMRS). A CRS is transmitted over a DL system bandwidth (BW) and can be used by UEs to demodulate data or control signals or to perform measurements. To reduce CRS overhead, an eNB can transmit a CSI-RS with a smaller density in the time and/or frequency domain than a CRS. For channel measurement, non-zero power CSI-RS (NZP CSI-RS) resources can be used. For interference measurement reports (IMRs), CSI interference measurement (CSI-IM) resources associated with zero power CSI-RS (ZP CSI-RS) resources can be used [3]. A CSI process consists of NZP CSI-RS and CSI-IM resources. DMRS is transmitted only in the BW of a respective PDSCH and a UE can use the DMRS to demodulate information in a PDSCH.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or the UE can transmit data and some UCI in a PUSCH and transmit remaining UCI in a PUCCH when the eNB configures the UE for simultaneous PUSCH and PUCCH transmission. UCI includes hybrid automatic repeat request acknowledgement (HARQ-ACK) information, indicating correct or incorrect detection of data transport blocks (TB s) in a PDSCH, scheduling request (SR) indicating whether a UE has data in its buffer, and CSI enabling an eNB to select appropriate parameters for link adaptation of PDSCH or PDCCH transmissions to a UE.

CSI includes a channel quality indicator (CQI) informing an eNB of a DL signal to interference and noise ratio (SINR) experienced by the UE, a precoding matrix indicator (PMI) informing an eNB how to apply beam-forming for DL transmissions to the UE, and a rank indicator (RI) informing the eNB of a rank for a PDSCH transmission. UL RS includes DMRS and sounding RS (SRS). A UE transmits DMRS only in a BW of a respective PUSCH or PUCCH and an eNB can use a DMRS to demodulate information in a PUSCH or PUCCH. A UE transmits SRS to provide an eNB with an UL CSI. A SRS transmission from a UE can be periodic (P-SRS, or trigger type 0 SRS) or aperiodic (A-SRS, or trigger type 1 SRS) as triggered by a SRS request field included in a DCI format conveyed by a PDCCH scheduling PUSCH or PDSCH.

A transmission time interval (TTI) for DL transmission or for UL transmission is referred to as a subframe (SF) and includes two slots. A unit of ten SFs is referred to as a system frame. A system frame is identified by a system frame number (SFN) ranging from 0 to 1023 and can be represented by 10 binary elements (or bits). A BW unit for a DL transmission or for an UL transmission is referred to as a resource block (RB), one RB over one slot is referred to as a physical RB (PRB), and one RB over one SF is referred to as a PRB pair. Each RB consists of $N_{sc}^{RB}$ sub-carriers, or resource elements (REs). A RE is identified by the pair of indexes (k,l) where k is a frequency domain index and l in a time domain index. An eNB informs parameters for a PDSCH transmission to a UE or parameters for a PUSCH transmission from the UE, through a DCI format with CRC scrambled by a cell radio network temporary identifier (C-RNTI), that is conveyed in a PDCCH the eNB transmits to the UE and is respectively referred to as DL DCI format or UL DCI format.

A communication system includes a downlink (DL) that conveys signals from transmission points such as base stations (BSs) or NodeBs to user equipments (UEs) and an uplink (UL) that conveys signals from UEs to reception points such as NodeBs. Additionally a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as E-UTRAN (Evolved Universal Terrestrial Access Network).

In a communication system, DL signals can include data signals conveying information content, control signals conveying DL control information (DCI), and reference signals (RS) that are also known as pilot signals. A NodeB transmits data information through a physical DL shared channel (PDSCH). A NodeB transmits DCI through a physical DL control channel (PDCCH) or an enhanced PDCCH (EPDCCH). Messages are transmitted on the PDCCH using a cell radio network temporary identifier (C-RNTI) to identify the intended UE. The C-RNTI is the RNTI to be used by a given UE while the UE is in a particular cell after the UE and a NodeB establish an RRC connection. A NodeB transmits one or more of multiple types of RS including a UE-common RS (CRS), a channel state information RS (CSI-RS), or a DeModulation RS (DMRS). A CRS is transmitted over a DL system bandwidth (BW) and can be used by UEs to obtain a channel estimate to demodulate data or control information or to perform measurements. To reduce CRS overhead, a NodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a sub-frame (SF) and can have, for example, duration of 1 millisecond. A number of ten SFs is referred to as a frame and is identified by a system frame number (SFN).

Traditionally, cellular communication networks have been designed to establish wireless communication links between mobile devices (UEs) and fixed communication infrastructure components (such as base stations or access points) that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles or other infrastructure or UEs. Such a network is referred to as a V2X network. Multiple types of communication links can be supported by nodes supporting V2X in the network and can utilize same or different protocols and systems.

Figure 4:
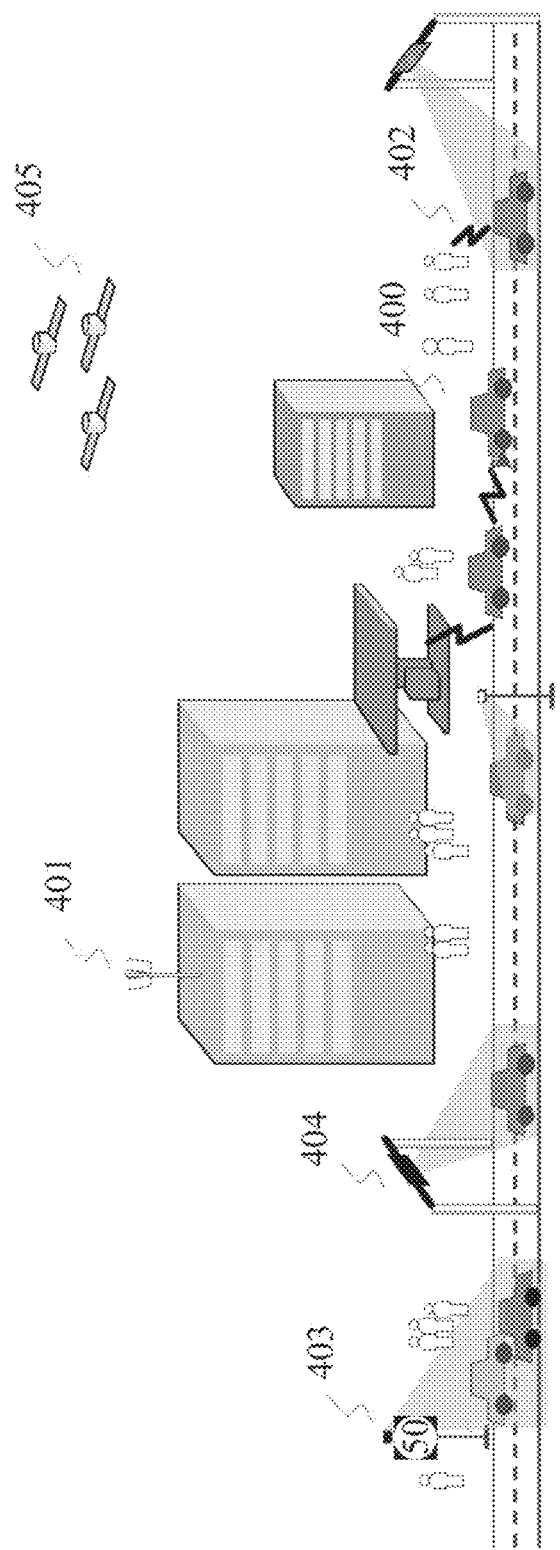
FIG. 4 illustrates an example use case of a vehicle-centric communication network according to illustrative embodiments of the present disclosure.

FIG. 4 illustrates an example use case of a vehicle-centric communication network according to illustrative embodiments of the present disclosure.

The vehicular communication, referred to as Vehicle-to-Everything (V2X), contains the following three different types: Vehicle-to-Vehicle (V2V) Communications, Vehicle-to-Infrastructure (V2I) Communications, and Vehicle-to-Pedestrian (V2P) Communications. These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

V2X communication can be used to implement several types of services that are complementary to a primary communication network or to provide new services based on a flexibility of a network topology. V2X can support unicasting, broadcasting, or group/multicasting as potential means for V2V communication 400 where vehicles are able to transmit messages to all in-range V2V-enabled devices or to a subset of devices that are members of particular group. The protocol can be based on LTE-D2D or on a specialized LTE-V2V protocol. V2X can support V2I communication 401 between one or more vehicles and an infrastructure node to provide cellular connectivity as well as specialized services related to control and safety of vehicular traffic. V2P communication 402 can also be supported, for example to provide safety services for pedestrians or traffic management services. V2X multicast communication 403 can be used to provide safety and control messages to large numbers of vehicles in a spectrally efficient manner. The two primary standardized messages for V2V/V2I communication are the periodic beacons called Cooperative Awareness Messages (CAM) and the event-triggered warning messages, called Decentralized Environment Notification Messages (DENM). The CAMs are periodically broadcasted beacons used to maintain awareness of the surrounding vehicles. These messages are sent with an adaptive frequency of 1-10 Hz. The CAMs include information such as position, type and direction.

The CAM generation triggers the following two conditions.

1. The time elapsed since the last CAM generation is equal to or greater than a minimum value and one of the following UE-dynamics related conditions is given: a. the absolute difference between the current heading of the originating UE and the heading included in the CAM previously transmitted by the originating UE exceeds 4°; b. the distance between the current position of the originating UE and the position included in the CAM previously transmitted by the originating UE exceeds 4 m; and c. the absolute difference between the current speed of the originating UE and the speed included in the CAM previously transmitted by the originating UE exceeds 0.5 m/s.

2. The time elapsed since the last CAM generation is equal to or greater than a maximum value.

If one of the above two conditions is satisfied, a CAM shall be generated immediately. Thus, CAM messages generation times and sizes are not completely deterministic from a traffic modelling perspective. Nevertheless, the typical time difference between consecutive packets generation is bounded to the [0.1, 1] sec range.

The DENMs are event-triggered warning messages which are generated to alert neighboring vehicles about potential hazards.

While vehicle devices can be able to support many different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 404 can be supported such as, for example, traffic tracking beacons. Satellite-based communication 405 can also be supported for V2X networks for communication or positioning services.

Direct communication between vehicles in V2V is based on a sidelink (SL) interface. Sidelink is the UE to UE interface for SL communication and SL discovery. The SL corresponds to the PC5 interface as defined in REF 6. SL communication is defined as a functionality enabling proximity services (ProSe) Direct Communication as defined in REF 6 between two or more nearby UEs using E-UTRA technology but not traversing any network node.

E-UTRAN allows such UEs that are in proximity of each other to exchange V2V-related information using E-UTRA (N) when permission, authorization and proximity criteria are fulfilled. The proximity criteria can be configured by the MNO. However, UEs supporting V2V Service can exchange such information when served by or not served by E-UTRAN which supports V2X Service. The UE supporting V2V applications transmits application layer information (e.g. about its location, dynamics, and attributes as part of the V2V Service). The V2V payload must be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

Figure 5:
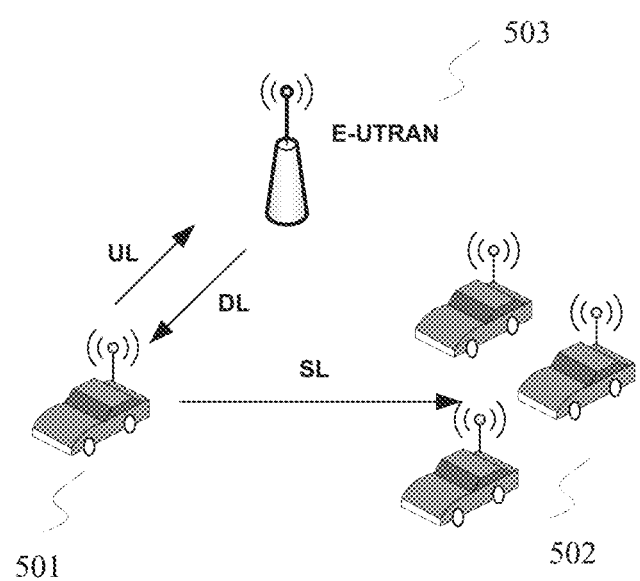
FIG. 5 illustrates an example sidelink (SL) interface according to illustrative embodiments of the present disclosure.

FIG. 5 illustrates an example SL interface according to illustrative embodiments of the present disclosure. The embodiments shown in FIG. 5 are for illustration only. Other embodiments could be used without departing from the scope of the present disclosure.

While UL designates the link from UE 501 to NodeB 503 and DL designates the reverse direction, SL designates the radio links over the PC5 interfaces between UE 201 and UEs 502. UE 501 transmits a V2V message to multiple UEs 502 in the SL. SL communication happens directly without using E-UTRAN technology and not traversing any network node NodeB 503. The PC5 interface re-uses existing frequency allocation, regardless of the duplex mode (frequency division duplex (FDD) or time division duplex (TDD). To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

SL transmission and reception occurs with resources assigned to a group of devices. A resource pool (RP) is a set of resources assigned for sidelink operation. It consists of the subframes and the resource blocks within the subframe. For SL communication, two additional physical channels are introduced: Physical Sidelink Control Channel (PSCCH) carrying the control information, and Physical Sidelink Shared Channel (PSSCH) carrying the data.

Figure 6:
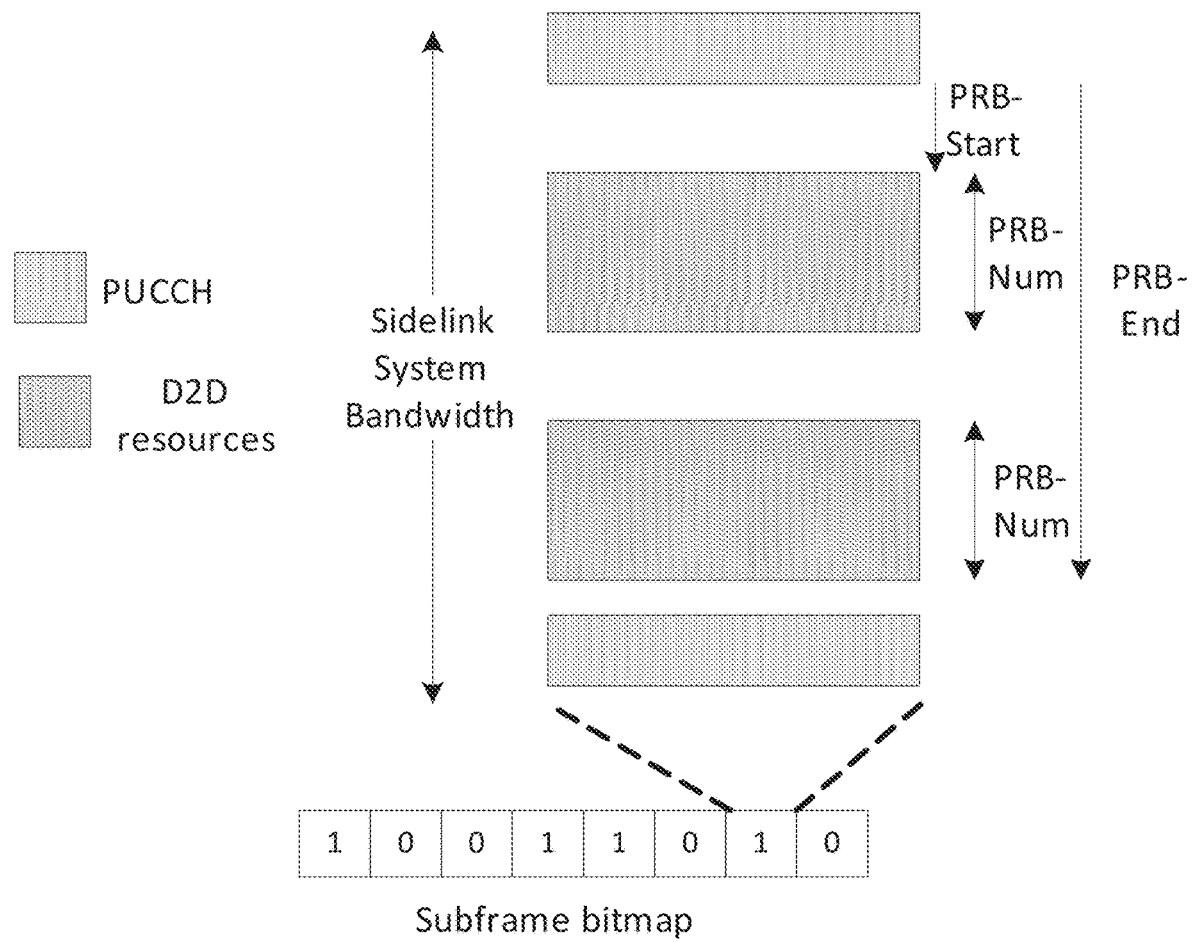
FIG. 6 illustrates an example resource pool for Physical Sidelink Control Channel (PSCCH) according to illustrative embodiments of the present disclosure.

FIG. 6 illustrates an example resource pool for PSCCH according to illustrative embodiments of the present disclosure.

The pool is defined as follows. (a) in frequency: by parameters, PRBnum that defines the frequency range in Physical Resource Block (PRB) bandwidth units; and PRB start and PRBend, which define the location in the frequency domain within the uplink band; and (b) in the time domain: by a bitmap that indicates the 1 msec sub-frames used for PSCCH transmission.

This block of resources is repeated with a period defined by a parameter SC-Period (expressed in sub-frame duration, i.e. 1 msec). The range of possible values for SC-Period is from 40 msec to 320 msec: low values are supported for voice transmission.

All the parameters needed to define the resource pool are broadcasted in a System Information Block (SIB) by the network. The devices which are not within coverage (and hence cannot acquire the SIB) shall use some pre-configured values internally stored. The PSCCH is used by the D2D transmitting UE to make the members of its group aware of the next data transmission that will occur on the PSSCH. The D2D transmitting UE sends the sidelink control information (SCI) on the PSCCH as shown in TABLE 1.

TABLE 1

| Parameter | Usage |
| --- | --- |
| Group Destination ID | used by the receiving devices to determine whether they have some interest in this announcement. If the identifier does not match, they do not need to monitor sidelink channels until the next SC-Period |

TABLE 1-continued

| Parameter | Usage |
| --- | --- |
| Modulation and Coding Scheme | To indicate modulation and coding rate for the data |
| Resource block assignment and hopping resource allocation | give the receiving devices information about the resources of the PSSCH that they shall decode in the frequency domain |
| Frequency hopping flag | |
| Time Resource Pattern (T-RPT) | give the receiving devices information about the resources of the PSSCH that they shall decode in the time domain |
| Timing advance | |

Devices interested in receiving D2D services blindly scan the whole PSCCH pool to search if a SCI format matching their group identifier can be detected. On the transmitting device side, resources to transmit the SCI format information shall be selected within the PSCCH pool.

There are two types of resource pools: Reception Resource Pools (Rx RPs) and Transmission Resource Pools (Tx RPs). These are either signaled by the NodeB for in-coverage case or a pre-configured value is used for the out-of-coverage case. Within a cell, there may be more Rx RPs than Tx RPs to enable reception from adjacent cells or from out-of-coverage UEs.

Two modes of resource allocation have been defined for SL communication: Mode 1, also referred as "Scheduled resource allocation" and Mode 2, also referred as "UE autonomous resource selection"

In mode 1, access to the sidelink resources is driven by the NodeB. The UE needs to be connected to transmit data in the following three cases.

The UE wishing to use direct communication feature sends an indication to the network. It will be assigned a temporary identifier SL-RNTI (Sidelink Radio Network Temporary Identifier). This identifier will be used by the eNodeB to schedule the future D2D transmission.

When the UE has some data to transmit in D2D mode, it sends a sidelink-BSR (Buffer Status Report) to the eNodeB which gives an indication on the amount of data to be transmitted in D2D mode. Based on this information, the eNodeB sends to the UE the allocation on both PSCCH and PSSCH for its D2D transmission. The allocation information is sent over the PDCCH (Physical Downlink Control Channel) by sending a DCI Format 5, scrambled by the SL-RNTI. The information contained in DCI format 5 is detailed in Table 2. A large part of the DCI Format 5 information is directly reflected in the content of the SCI format 0.

Based on the information received in the DCI format 5, the D2D transmitting devices sends the SCI format 0 over the resources within the PSCCH pool allocated by the eNodeB, followed by the data over the resources allocated by the eNodeB for PSSCH transmission.

TABLE 2

| Parameter | Bits | Usage |
| --- | --- | --- |
| Resource for PSCCH | 6 | Provides the information of the transmitting UE of the resource to be used for SCI format 0 transmissions within the PSCCH pool. |
| TPC command | 1 | If this bit is not set, the transmitting UE is allowed to transmit D2D signals at maximum power. Otherwise, it shall comply with power control rules based on open loop. |
| Resource block assignment and hopping resource allocation | 5-13 | give to the receiving devices the information of the resources of the PSSCH that they shall decode in the frequency domain |
| Frequency hopping flag | 1 | |
| Time Resource Pattern (T-RPT) | 7 | give to the receiving devices the information of the resources of the PSSCH that they shall decode in the time domain |

In mode 1, there is no pre-allocated or reserved resource for PSSCH: it is assigned "on-demand" by the NodeB. In addition, since the NodeB is responsible to give access to the resources within the PSCCH pool, collision on the PSCCH transmission can be avoided.

In mode 2, the UE transmitting D2D data does not need to be connected to the eNodeB: it selects autonomously and randomly the resources within the PSCCH pool to transmit the SCI Format 0.

In addition to the PSCCH pool, there is also a PSSCH pool which defines reserved resources for PSSCH transmission. It is defined in a similar way as the PSCCH pool (PRBStart, PRBend, PRBNum in the frequency domain and a sub-frame bitmap in the time domain which is repeated up to the next PSCCH occurrence). The SCI Format 0 designates the portion of the pool that is used for D2D transmission. Since the transmitting UE is not necessarily connected to the NodeB, the timing advance information may be not known and the corresponding parameter in the SCI Format 0 shall be set to 0.

Figure 7:
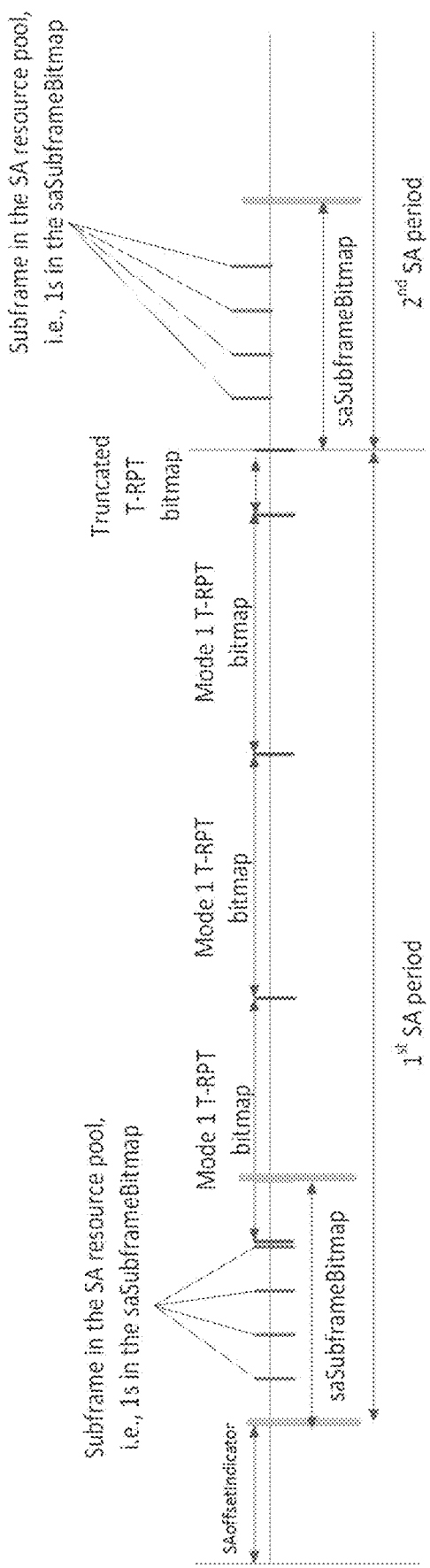
FIG. 7 illustrates an example subframe resource allocation according to illustrative embodiments of the present disclosure.

FIG. 7 illustrates an example subframe resource allocation according to illustrative embodiments of the present disclosure. The embodiments shown in FIG. 7 are for illustration only. Other embodiments could be used without departing from the scope of the present disclosure.

The subframe bitmap discussed in FIG. 6 is split into two regions: control region and data region. The first SC Period starts at an offset from SFN=0 and is periodically repeated with a configurable length between 40 msec and 320 msec. It starts with the control region which contains the SCI0 control element carried by the PSCCH. SubframeBitmapSL indicates the subframes used for the PSCCH. Directly after the last bit of the SubframeBitmapSL which is set to 1, the data region starts. It consists of another bitmap, the T-RPT bitmap, which is a bitmap indicating the subframes which are used for the data transmission. This bitmap is repeated until the end of the SC Period, where the last occurrence may be truncated.

The T-RPT bitmap is dynamic and may therefore be different for each UE and for each SC Period. To be more precise, the set of all subframes which are allocated for the resource pool is restricted by using a periodic pattern with a periodicity of 8 for FDD, and a shorter one for some TDD configurations. Necessary parameters to determine this bitmap in order to receive the data part are signaled via the PSCCH.

For Mode 2, this structure is quite similar. The main difference is that start of the data part does not depend on the content of the SubframeBitmapSL, but has a fixed offset from the start of the SC Period. In addition, the algorithm to determine the bitmap pattern is somewhat different and may explicitly exclude some configurations.

Semi-persistent scheduling (SPS) is available for DL/UL communication in LTE, primarily to support voice. Since the PDCCH is limited size (generally, 3 OFDM symbols), there is a limit as to how many DCIs can be carried in a subframe. This can in-turn limits the number of UEs which can receive an allocation for that subframe when using dynamic scheduling (a 1:1 PDCCH-to-PxSCH method). With SPS, the UE is pre-configured by the eNB with an SPS-RNTI (allocation ID) and a periodicity. Once pre-configured, if the UE were to receive an allocation (DL/UL) using the SPS-RNTI (instead of the typical C-RNTI), then this one allocation would repeat according to the pre-configured periodicity.

During SPS, certain parameters remain fixed for each allocation: RB assignments, Modulation and Coding Scheme, etc. Because of this, if the radio link conditions change, a new allocation will have to be sent (PDCCH). SPS can be configured/re-configured by RRC at any time using SPS-Config.

This SPS-Config includes the configuration for semiPersistSchedC-RNTI (sps-CRNTI), sps-ConfigDL and sps-ConfigUL. SPS can be configured only in the uplink (sps-ConfigUL), or in the downlink (sps-ConfigDL) or in both directions. Configuration of SPS doesn't mean that the UE can start using SPS grants/assignments. The eNB has to explicitly activate SPS, in order for the UE to use SPS grants/assignments.

Also, to avoid wasting resources when a data transfer is completed, there are several mechanisms for deactivating SPS (explicit, inactivity timer, etc.). When configuring SPS in any direction either UL or DL, SPS C-RNTI is mandatorily provided by the eNB. Soon after the UE is configured with SPS C-RNTI, the UE is configured by higher layers to decode PDCCH with CRC scrambled by the SPS C-RNTI. A UE shall monitor PDCCH with CRC scrambled by the SPS C-RNTI in every subframe as the eNB can activate/re-activate/release SPS at any time using Downlink control information (DCI).

There is a need to support semi-persistent transmissions for V2X communications for the following reasons. There is a requirement that the E-UTRA(N) shall be capable of transferring periodic broadcast messages between two UEs supporting V2X Services with variable message payloads of 50-300 bytes, not including security-related message component. For many V2V data services, the message sizes are small and the inter-arrival time of transmission is fairly constant (for example, the CAM messages are periodic with frequency of 1-10 Hz). The control signaling overhead (PSCCH and/or PUCCH) can be significant in order to support a large number of vehicles. So, it is important to allocate the resources at once and let the vehicle use these resources instead of re-allocating the resources periodically. To support this efficiently, semi-persistent scheduling support is desirable for V2X communication. Although the CAM traffic is approximately periodic for relatively long intervals or in proximity of certain events, it is necessary to take into account the possible deviations when designing semi-persistent transmissions in the LTE V2X framework.

SPS is not supported in SL communication using Rel-13. The PSCCH transmissions need to be enhanced to support SPS. Furthermore, multiple SPS configurations for a given UE can be supported.

The present disclosure considers semi-persistent transmissions on both the SL (under mode 1 and mode 2) as well as the UL.

Figure 8:
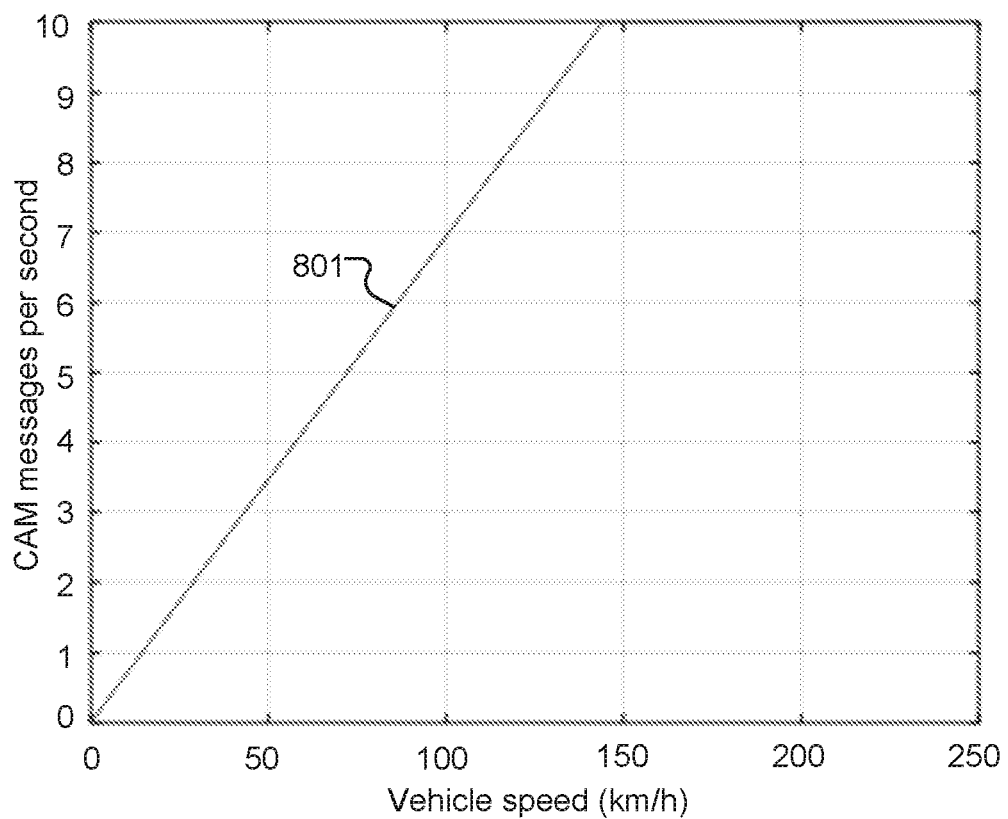
FIG. 8 shows an example of Cooperative Awareness Messages (CAM) message periodicity as a function of UE speed according to the embodiments of this disclosure.

FIG. 8 shows an example of CAM message periodicity as a function of UE speed according to the embodiments of this disclosure. The embodiments shown in FIG. 8 are for illustration only. Other embodiments could be used without departing from the scope of the present disclosure.

CAM messages 801 are generated between 1-10 messages per second based on the speed of the UE. However, it is likely that UEs in a given location share similar speeds, based on speed limits and the traffic in that location. Thus, the eNodeB can configure different periodicity of the CAM message reports from the UE based on the geo location of the transmitting UE. For example, the eNodeB can configure vehicles in the freeway to transmit their CAM messages more frequently, say every 100 ms, compared to vehicles on the side streets, who may be requested to transmit every 500 ms, for example.

As a vehicle moves, its speed may vary in a few seconds (which is still slow compared to the communication time period) and over time, the periodicity P of the CAM message transmissions from the UE will change. This will cause empty allocations and can lead to inefficient usage of resources as the vehicle speed changes. If a fixed period is assigned to the UE for SPS, either the period has to be dynamically updated or techniques to improve resource efficiency have to be considered. Furthermore, the message size may also change when additional CAM information such as security information may be transmitted. Thus, dynamic variation of both CAM message periodicity and message size needs to be considered in the SPS design for V2X.

Figure 9:
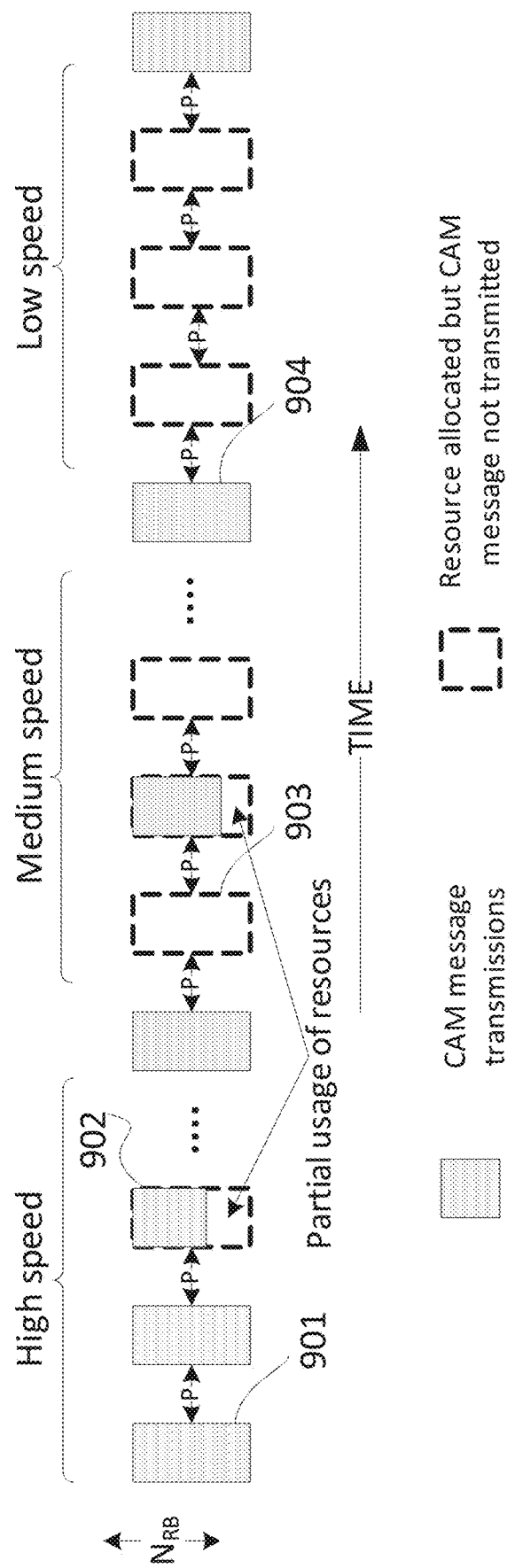
FIG. 9 illustrates an example of the semi-persistent CAM messages transmitted by the vehicle UE to the eNodeB (eNB) or to other UEs, according to the embodiments of this disclosure.

FIG. 9 illustrates an example of the semi-persistent CAM messages transmitted by the vehicle UE to the eNodeB (eNB) on the UL or to other UEs on the SL, according to the embodiments of this disclosure. The embodiments shown in FIG. 9 are for illustration only. Other embodiments could be used without departing from the scope of the present disclosure.

The vehicle transmits CAM messages which are triggered by external conditions, depending on the originating UE dynamics such as UE speed as shown in FIG. 8 and the channel congestion status. FIG. 9 shows an example where the periodicity can be reducing dynamically in a freeway as the vehicle UE goes from a fast speed 901 (140 km/hr, for example) to a medium speed 903 (40 km/hr) to a slow speed 904 (10 km/hr) due to traffic conditions. The CAM messages, if transmitted, are sent based on a semi-persistent allocation and use resource blocks of size NRB with periodicity P, where P can be for example, 100 ms. Even in a given area, with speed or direction variations for a given vehicle UE, there may be gaps in the transmission such as 903, where no message is transmitted, for example, when the distance between the current position of the transmitting UE and the position included in the CAM previously transmitted by the UE is less than 4 m.

In one embodiment of this disclosure, the eNodeB configures the periodicity P for the vehicle UE for semi-persistent transmissions based on the geographical information of the UE and/or the driving speed limits set in that geographical location. For example, vehicle UEs on the freeway or platooning for autonomous vehicles can use a periodicity of traffic generation of P=100 ms, while vehicle UEs on the side streets in a different geographical location can use a periodicity of P=300 ms.

Allocation of SPS Resources by the eNB

In embodiments of the present disclosure, exclusive resources are allocated by the eNodeB for semi-persistent transmissions. These empty allocations can lead to inefficient usage of resources as the vehicle speed decreases, for example. The CAM message size can also change such as from 901 to 902 when additional CAM information such as security information may be transmitted.

Dynamic adaptation of SPS periodicity based on UE speed, direction change, etc. can have high overhead for the eNodeB (for mode 1 SL and/or UL SPS operation) and can cause significant resource allocation adjustments.

In one embodiment, the eNodeB (eNB) allocates shared SPS resources for semi-persistent transmissions from multiple vehicle UEs. Multiple vehicle UEs can share a common set of SPS resources. In another embodiment of this disclosure, a shared resource allocation with a periodicity of 100 ms, for example, is configured by the eNodeB for semi-persistent transmissions from multiple vehicle UEs.

Figure 10:
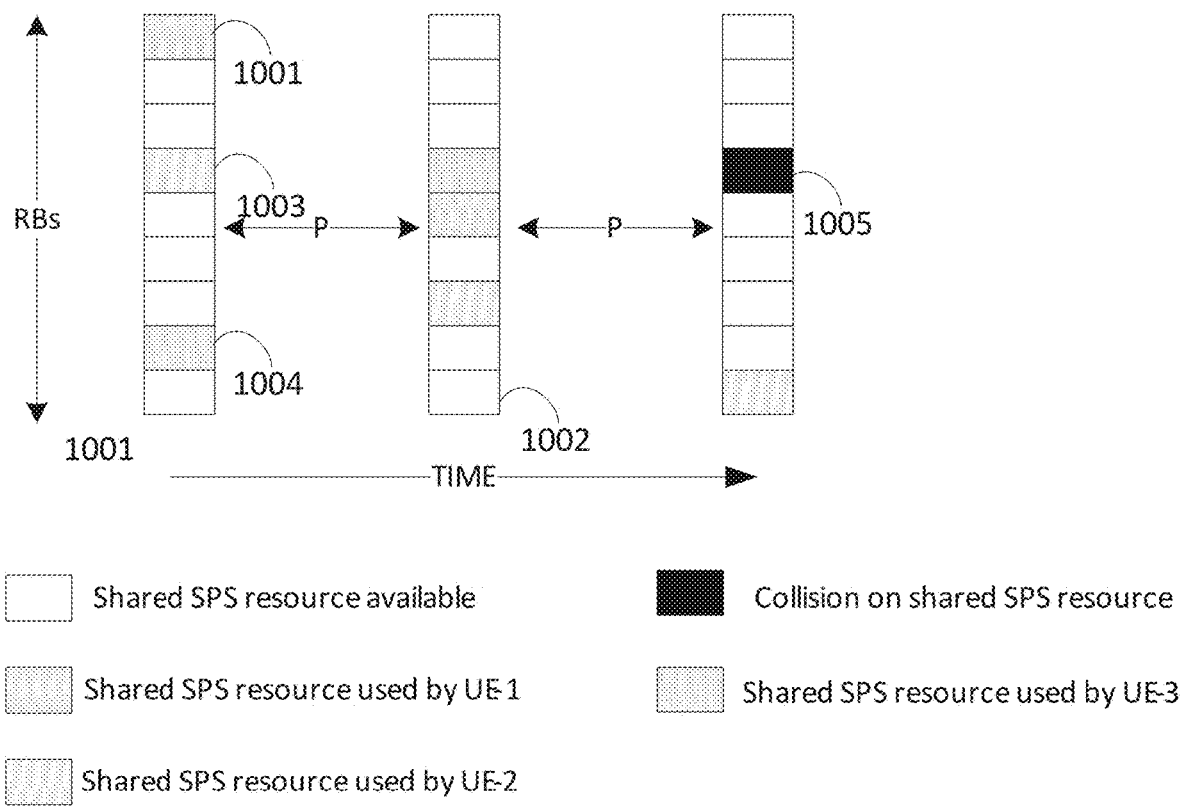
FIG. 10 shows an example of a shared resource allocation for uplink (UL) semi-persistent transmissions according to the embodiments of this disclosure.

FIG. 10 shows an example of a shared resource allocation for UL semi-persistent transmissions according to the embodiments of this disclosure. The embodiments shown in FIG. 10 are for illustration only. Other embodiments could be used without departing from the scope of the present disclosure.

The resource allocation for semi-persistent transmissions 1001 is shared between vehicle UEs 1002, 1003, 1004 in this example. Multiple vehicle UEs can share a common set of SPS resources.

Random Resource Allocation

In one embodiment, the vehicle UEs randomly select at least one of the resources within the shared resource allocation for transmitting each CAM message. While this may lead to occasional collisions as shown in 1005, it can provide improved efficiency of resource usage. Since CAM messages contain location information etc. that assist resource allocation and are transmitted frequently, the reliability of these messages is not as critical as DENM messages i.e. loss of occasional CAM messages may be acceptable.

Periodicity Based SPS Resource Allocation

In another embodiment of the present disclosure, the resources are selected in the shared SPS resource pool based on the dynamic periodicity of CAM message transmissions. In periodicity based allocation, SPS messages from multiple UEs are multiplexed on the same SPS resource based on message periodicity. i.e. transmitting UE tries to multiplex UEs, if possible, in a given resource allocation while aiming to minimize overlaps for possible collisions.

Figure 11:
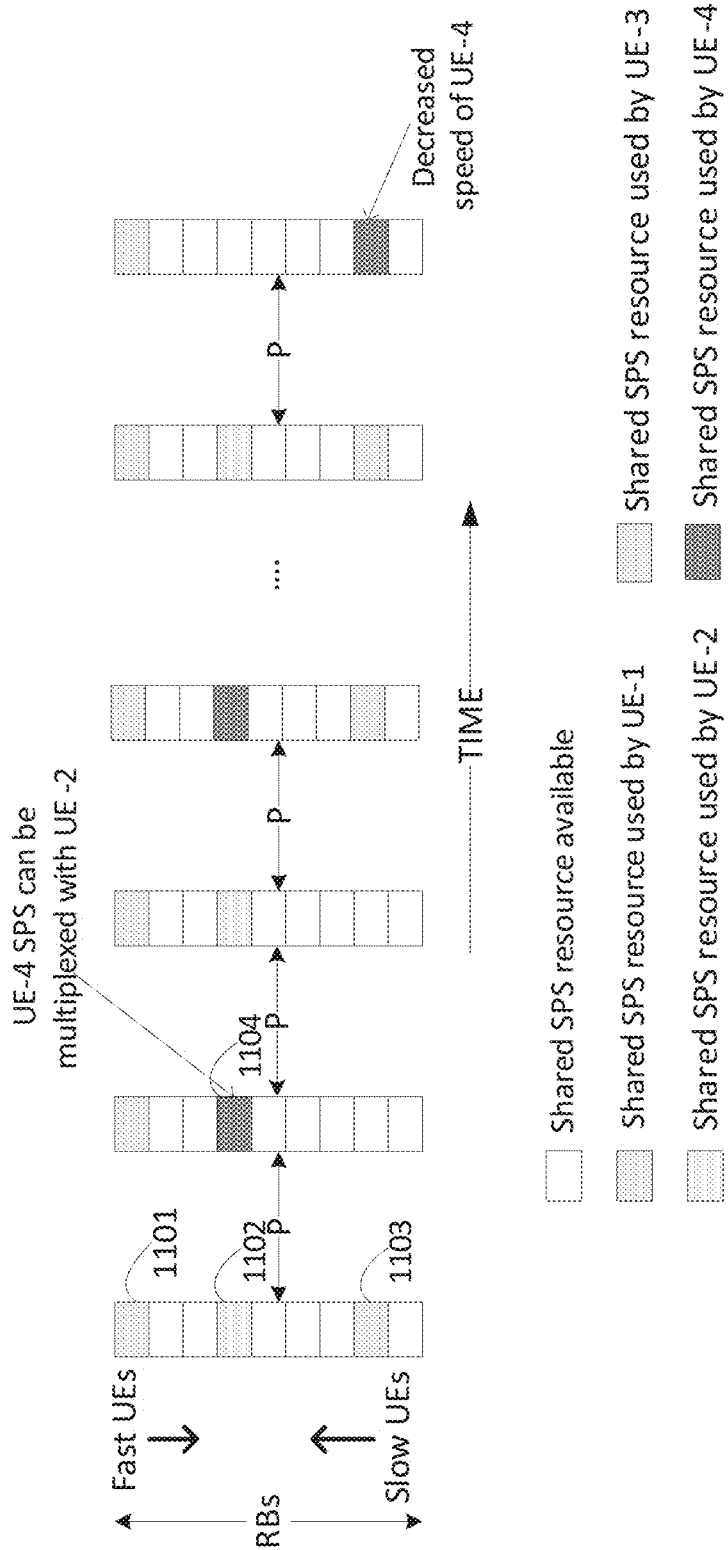
FIG. 11 shows an example embodiment of this disclosure, where the resources are allocated in the shared set according to dynamic periodicity.

FIG. 11 shows an example embodiment of this disclosure, where the resources are allocated in the shared set according to dynamic periodicity (due to speed changes, for example). The embodiments shown in FIG. 11 are for illustration only. Other embodiments could be used without departing from the scope of the present disclosure.

The UE changes its selected resource for UL transmission if there is a change in periodicity of the CAM message transmission (due to change in speed/direction etc.). For slower speed UEs, as shown by UE-3 1103 for example, the periodicity of CAM message transmissions is larger and that means more slow speed UEs can be multiplexed in the same resource allocation.

In some embodiments, UE-2 1102 and UE-4 1104, which have the same periodicity can be multiplexed into the same set of resources in time but being offset by the periodicity P (=100 ms, in this embodiment). If the speed of UE-4 1104 decreases at a later time, it changes its resource allocation and finds another set of resources or vehicles to get multiplexed with.

In embodiments of the present disclosure, where sufficient resources exist, multiple shared resources can be configured for SPS transmissions, each supporting a different periodicity, which are selected based on the current periodicity of the CAM message transmissions for a given vehicle UE.

Since the SPS resources are not exclusive to a UE, there is now a need to send control information in the first few symbols of the SF, for example, followed by the message. The UEs can transmit control information formats to inform the eNB or other UEs of transmission parameters for subsequent reception. This method allows the UE to use different MCS/TBS and possibly different RBs depending on its SINR or data TBS it needs to convey. The RBs in the shared SPS resources can be configured by the eNB using RRC, for example or could be based on sensing. Even the subframes where the RBs are available can be configured by the eNB (i.e. if some latency can be tolerated, the SFs/frames for UE-initiated transmissions can be configured and need not be the same every SF). When the UE has data to transmit, the UE sends control information about the data transmission (such as UE ID, MCS, RBs from the configured RBs, etc.). In some embodiments, a search space is used so that the eNB does not have too many hypotheses to check for the control information, (e.g. control can be sent in a finite number of combinations of RBs within the configured set of RBs). In other embodiments, the control can be transmitted in more than one location in the shared set of resources, which can reduce combined probability of collision. In yet other embodiments, the control could be transmitted in a reserved region in the set of shared resources, while only the data is shared in the shared resources. The benefit of this approach is that it provides RB and MCS adaptation while supporting semi-persistent transmissions with improved resource management.

A UE can thus, be configured to support semi-persistent transmissions for UL/DL and SL transmissions.

Semi-Persistent Transmissions on the Sidelink

CAM messages are also transmitted on the SL for both mode 1 and mode 2 operation. In addition, the SPS transmissions on SL may be repeated multiple times (within a frame or subframe, for example), to support half-duplex transmissions. This will allow other UEs who are also transmitting at the same time to be able to receive the messages at a different time instance.

Mode 1 Operation

SPS Configuration

Multiple SPS configurations can be configured for a given UE. The configurations can support multiple periodicities, multiple RB sizes and MCS for a given UE.

Multiple SL SPS configurations can be used to handle the periodicity variation for the basic message transmission. In this case, only switching between multiple SL SPS configurations is needed and only 1 SL SPS configuration needs to be active at a given time. The additional messages may either be configured using SPS with a different periodicity, if possible, or may be dynamically scheduled by the eNB. In this case, multiple SPS configurations for SL are actively running at a given time.

To support the dynamic variation for V2V messages, it is proposed to have two types of SPS configurations: Type-1 SPS configuration: where messages are of the same allocation, MCS and periodicity; and Type-2 SPS configuration: where messages of different allocation, MCS and periodicity are multiplexed within same configuration. Either multiple SPS configurations of Type 1 or a single configuration of Type 2 can be supported at a given time for a UE.

Figure 12:
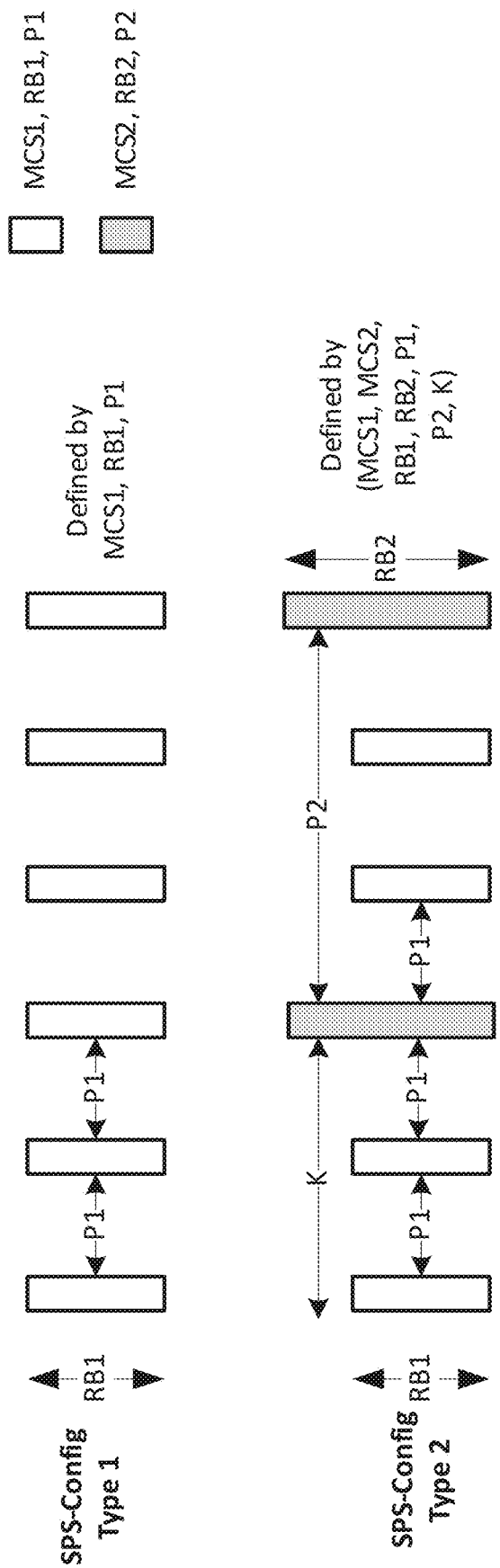
FIG. 12 shows an example design of Semi-persistent scheduling (SPS) configuration types according to the embodiments of this disclosure.

FIG. 12 shows an example design of SPS configuration types according to the embodiments of this disclosure. The embodiments shown in FIG. 12 are for illustration only. Other embodiments could be used without departing from the scope of the present disclosure.

A Type-1 SPS configuration is defined by a combination of MCS, resource blocks (RB) and periodicity (P). A type-2 SPS configuration is defined by a combination of multiple MCS, resource blocks and periodicities along with offsets (K) which indicates the relative offset of the periodicity of the multiple configuration with respect to the first configuration. These configurations are supported by RRC signaling. To support dynamic variation in V2X messages, multiple SPS processes of a given type can be active for the UE.

The SPS is configured via RRC signaling. The SPS can be changed dynamically by the eNB based on UE UL transmissions, for example, indication of a zone change, speed change and/or priority, based on messages sent in the PUSCH. The SPS change can also be based on a scheduling request from the UE, for example, indicated in the PUCCH.

In embodiments of the present disclosure, the SPS configuration is split into 2 parts: SPS-Config-Common-UE which has the common parameters across configurations for the UE and includes at least SPS SL-RNTI; and SPS-Config-Specific-UE which has each SPS configuration-specific parameters for the UE and includes at least: Scheduling interval (in multiples of sub-frames); Activation sub-frame offset: The sub-frame offset at which this SPS will start after activation; SPS-Configuration ID: Unique identifier for this SPS configuration; Implicit release after; MCS (modulation, coding rate); and Resource blocks.

It is proposed that a common SPS RNTI be used for SL across multiple SPS configurations. It is proposed that a unique SPS configuration ID for every SPS configuration can be provided to the UE as part of the RRC configuration. Another option is that the UE implicitly assumes SPS configuration IDs based on the order in which the UE-specific configurations are configured by the RRC. Since only 1 SPS can be activated in a SF using DCI/PDCCH, the sub-frame offset for activation is indicated as part of the configuration. The MCS and resource blocks can be indicated as part of the DCI in the PDCCH.

In embodiments of the present disclosure, multiple SPS configurations are used (there is no common configuration). SPS-Config-Specific-UE which has each SPS configuration-specific parameters for the UE and includes at least (i) RRC: SPS SL-RNTI; Scheduling interval (in multiples of sub-frames); Activation sub-frame offset: The sub-frame offset at which this SPS will start after activation; SPS-Configuration ID: Unique identifier for this SPS configuration; and Implicit release after, and (ii) DCI/PDCCH: MCS (modulation, coding rate); and Resource blocks.

In one embodiment, it is proposed that each SPS is distinguished by a different RNTI. It is proposed that a unique SPS configuration ID for every SPS configuration can be provided to the UE as part of the RRC configuration. Another option is that the UE implicitly assumes SPS configuration IDs based on the order in which the UE-specific configurations are configured by the RRC or the SPS configuration IDs are assigned based on sorting of a configuration parameter such as RNTI. Since only 1 SPS can be activated in a SF using DCI/PDCCH, the sub-frame offset for activation is indicated as part of the configuration. The MCS and resource blocks can be indicated as part of the DCI in the PDCCH.

It is proposed that the maximum number of simultaneous SPS configurations for a UE be limited to 4.

Figure 13:
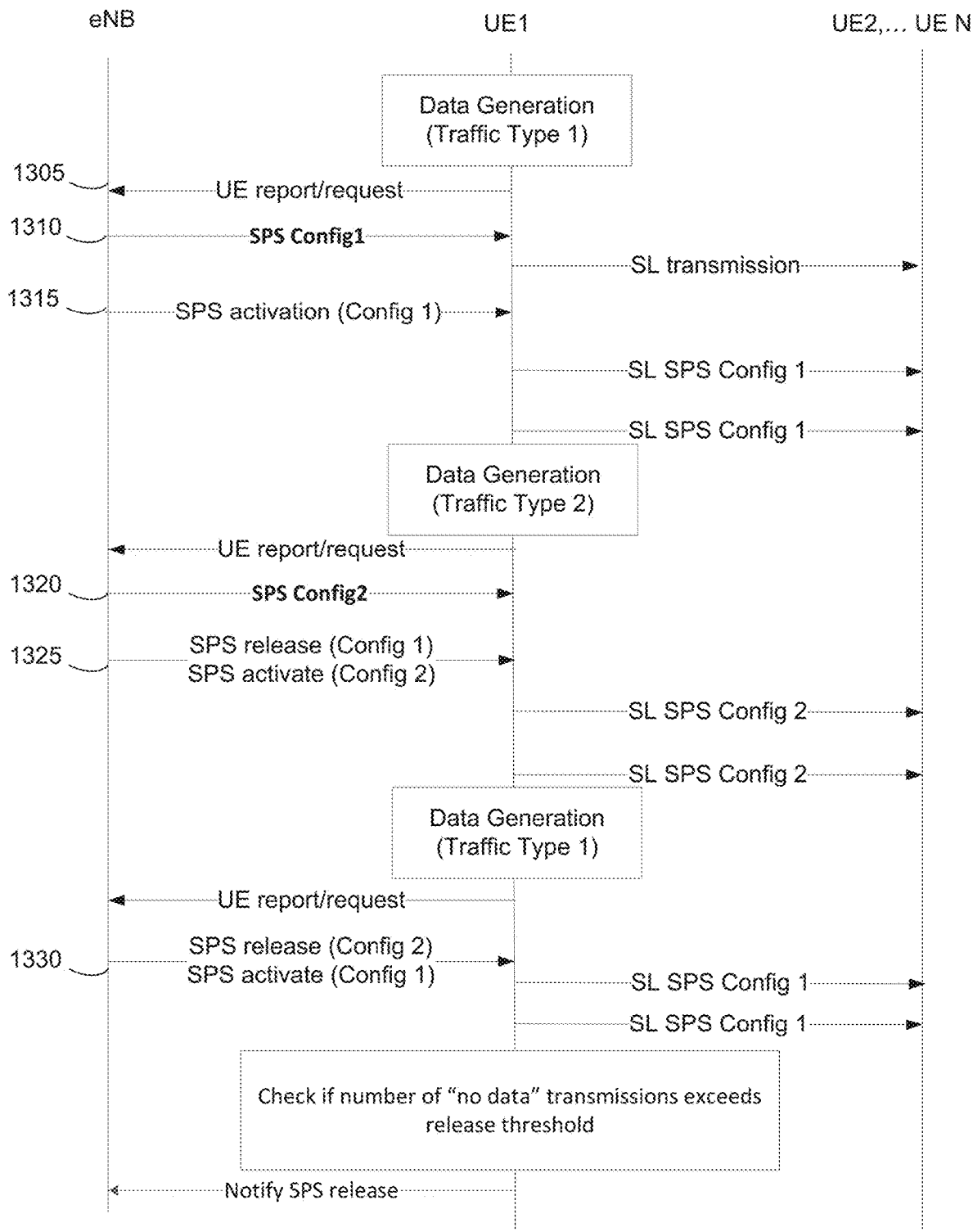
FIG. 13 shows the SPS operation for Mode 1 operation, where the UE has a single SPS process at a given time, but can switch between multiple SPS processes, according to the embodiments of this disclosure.

FIG. 13 shows the SPS operation for Mode 1 operation, where the UE has a single SPS process at a given time, but can switch between multiple SPS processes, according to the embodiments of this disclosure. The embodiments shown in FIG. 13 are for illustration only. Other embodiments could be used without departing from the scope of the present disclosure.

The eNB first configures a common SPS configuration for the UE, such as SL RNTI, (if used). Based on the traffic type (which requires SPS config 1), the UE can request a specific SPS configuration for SL in step 1305. This request can be made via a scheduling request on the PUCCH, for example. Alternately, the eNB can determine the SL SPS configuration based on the UE reporting of geo-information, speed and the like. The UE reporting can be done by transmission of a CAM message on the PUSCH, for example. In step 1310, the eNB then configures the specific SPS configuration (Config 1) parameters such as periodicity, using RRC, for example. In step 1315, the eNB then activates the SPS configuration (Config 1) via DCI on the (E)PDCCH. When the traffic type changes (requiring SPS Config 2) and is known to the eNB via a scheduling request or by CAM messages, the eNB configures another SPS (Config 2) for the UE in step 1320, without terminating the first SPS (Config 1) via RRC, for example. The eNB then releases the first configuration (Config 1) and activates the second (Config 2) in step 1325. When the traffic type changes again to traffic type 1, no new RRC configuration is needed for Config 1 and the eNB can directly release Config 2 and activate Config 1 in step 1330. The SPS can also be implicitly released if the number of "no data" transmissions exceeds a threshold set by the eNB.

Figure 14:
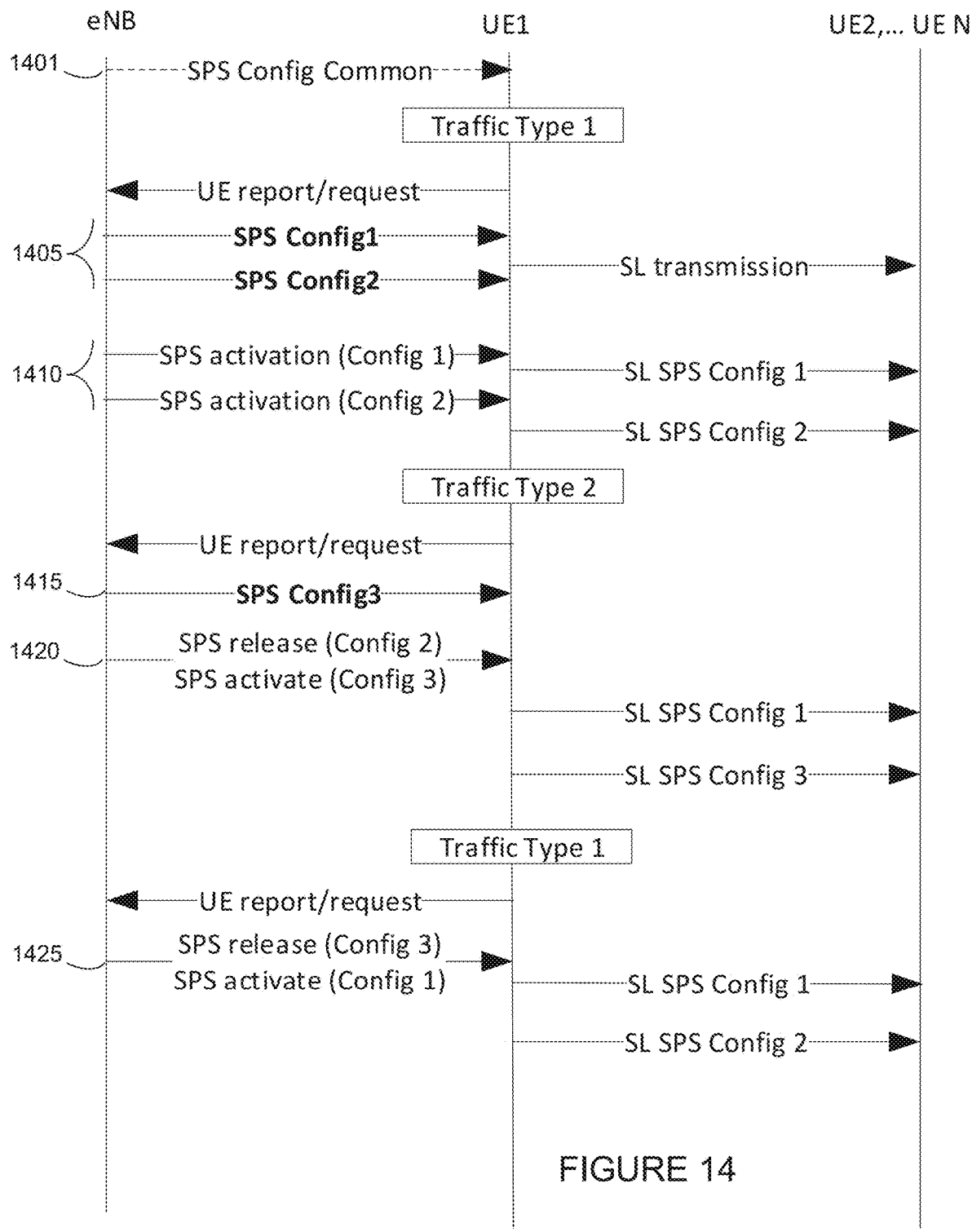
FIG. 14 shows the SPS operation for Mode 1 operation where the UE has simultaneous SPS processes running in parallel, according to the embodiments of this disclosure.

FIG. 14 shows the SPS operation for Mode 1 operation where the UE has simultaneous SPS processes running in parallel, according to the embodiments of this disclosure. The embodiments shown in FIG. 14 are for illustration only. Other embodiments could be used without departing from the scope of the present disclosure.

The eNB first configures a common SPS configuration for the UE, such as SL RNTI in step 1401. Based on the traffic type (requiring SPS Config 1 and SPS Config 2), the UE can request multiple specific SPS configurations for SL.

Scheduling Request (SR) Enhancement for Multiple SPS

The UE provides periodic reports to the eNB by configuring a reporting SPS on the UL. Based on the UE reports, the eNB may configure the UE with one or more SPS transmissions for SL. The scheduling request on the UL should be enhanced to request one of multiple SPS configurations. The UE request can be made via a scheduling request on the PUCCH, for example. Currently, the SR has only 1 bit for indicating the SPS request. SR currently uses a simple ON-OFF keying scheme, where the UE transmits a SR with BSPK modulation symbol d(0)=+1 to request a PUSCH resource and transmitting nothing if it does not request to be scheduled.

If there are multiple SPS configurations, for example, up to a maximum of 4 configurations, two bits could be used in the SR to indicate the configuration. In this case, an ON-OFF keying scheme can still be used, but with QPSK modulation symbols instead of BPSK, with each configuration indicated by one of the 4 constellation points of QPSK modulation, to request a PUSCH resource and transmitting nothing if it does not request to be scheduled. Table 3 shows an example of the SR using QPSK modulation, assuming maximum of 4 SPS configurations are available. The SR/PUCCH approach will have smaller latency if the configuration is selected by the UE.

TABLE 3

| Modulation bits | Scheduling Request |
| --- | --- |
| 00 | Request SPS configuration 0 |
| 01 | Request SPS configuration 1 |
| 10 | Request SPS configuration 2 |
| 11 | Request SPS configuration 3 |

Alternately, the configuration information can be transmitted in the PUSCH, especially if the UE does not indicate one of the multiple configurations but provides other information for the eNB to determine the configuration. The eNB can determine the multiple SL SPS configurations based on the UE reporting of geo-information, speed etc. The UE reporting can be done by transmission of a CAM message on the PUSCH, for example. In step 1405, the eNB then configures the specific SPS configuration (Config 1 and Config 2) parameters such as periodicity, using RRC, for example. The eNB then activates the SPS configuration (Config 1 and Config 2) via DCI on the (E)PDCCH in step 1410. When the traffic type changes (which requires Config 1 and Config 3) and is known to the eNB via a scheduling request or by CAM messages, the eNB configures another SPS (Config 3) for the UE in step 1415, without terminating the first two SPS (Config 1 and Config 2) via RRC, for example. The eNB then releases the first configuration (Config 2) and activates the third (Config 3) to support traffic type 2 in step 1420. When the traffic type changes again to traffic type 1, no new RRC configuration is needed and the eNB can directly release Config 3 and activate Config 1 in step 1425.

In another embodiment of the disclosure, the UE partitions the messages such that the common part is sent using SPS while the non-common (additional messages) are sent using dynamic resources allocated based on a dynamic scheduling request sent on the PUCCH.

Figure 15:
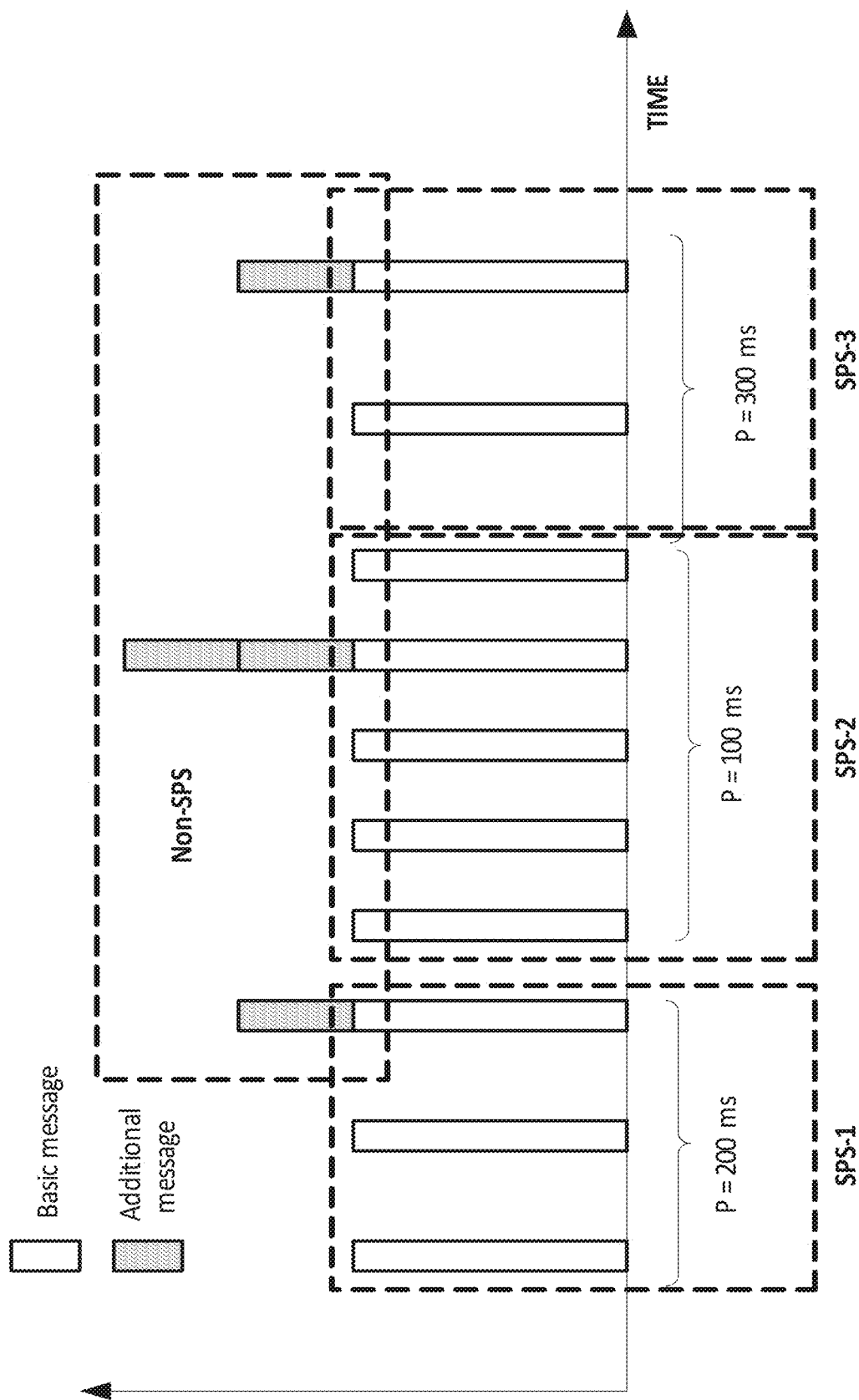
FIG. 15 shows the partitioning of the messages by the UE for SPS and non-SPS transmissions, based on an embodiment of this disclosure.

FIG. 15 shows the partitioning of the messages by the UE for SPS and non-SPS transmissions, based on an embodiment of this disclosure. The embodiments shown in FIG. 15 are for illustration only. Other embodiments could be used without departing from the scope of the present disclosure.

The UE switches between SPS configurations SPS-1, SPS-2 and SPS-3 in this example, to change the periodicity of the basic message transmissions, while the additional messages are sent in a non-SPS method based on dynamic resources allocated by the eNB based on UE request. Alternately, the additional messages may also be transmitted using multiple type-1 SPS configurations. It is proposed that the MAC fragments the V2X messages into proper (equal) sizes to enable SPS transmissions, as shown in FIG. 15.

Figure 16:
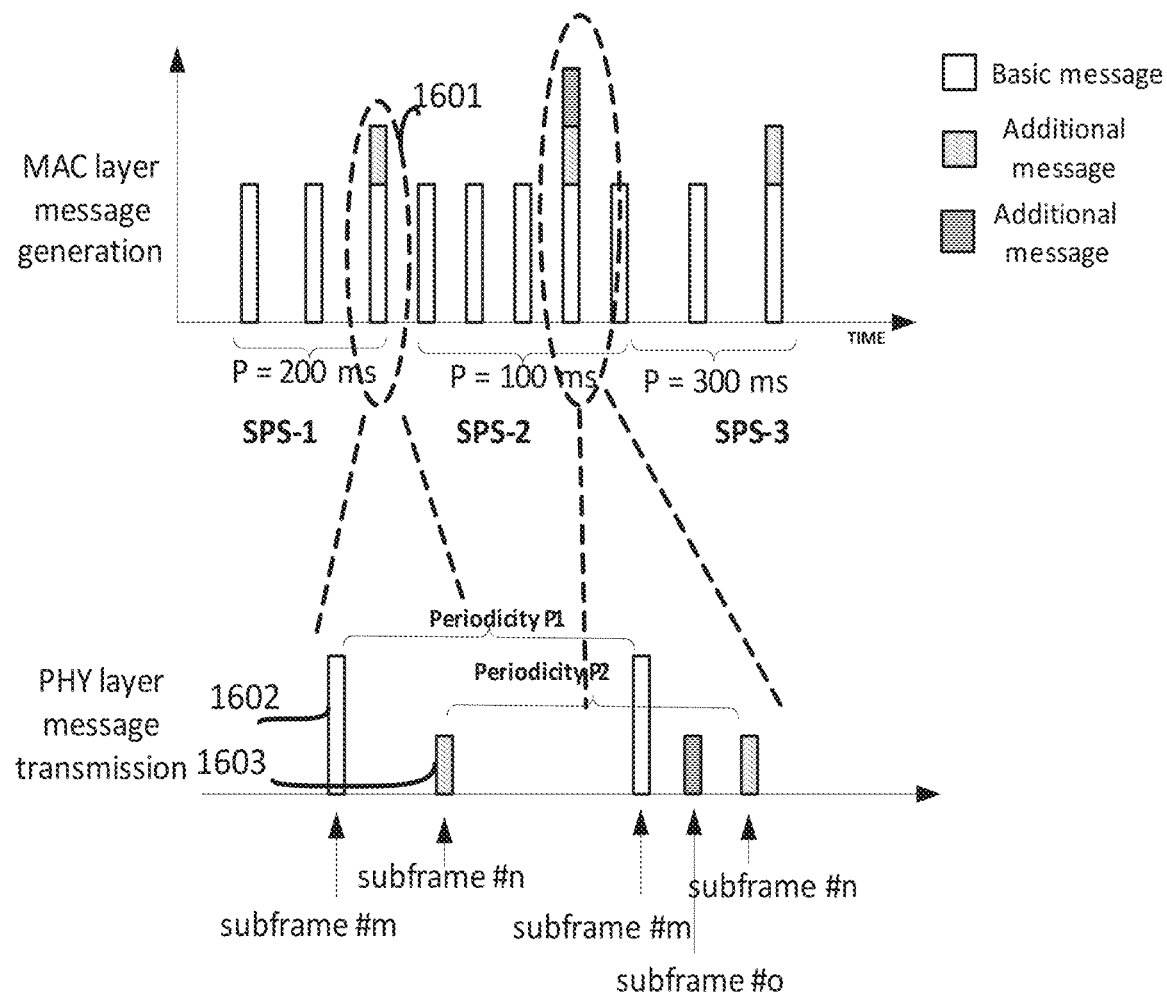
FIG. 16 shows the fragmentation of the V2X messages into multiple transport blocks for SPS and transmission on different subframes, according to the embodiments of this disclosure.

FIG. 16 shows the fragmentation of the V2X messages into multiple transport blocks for SPS and transmission on different subframes, according to the embodiments of this disclosure. The embodiments shown in FIG. 16 are for illustration only. Other embodiments could be used without departing from the scope of the present disclosure.

The messages are fragmented to support SPS transmissions with same message sizes and RB utilization. At the physical layer, these messages after fragmentation are transmitted in different sub-frames so that only a single transport block (TB) is transmitted on a given subframe. Each of these transport blocks are part of a different SPS process due to their different periodicities. A V2X message 1601 generated from upper layers is fragmented into multiple transport blocks 1602 and 1603. Each of these transport blocks is sent in a different subframe. For example, transport block 1602 is sent at subframe #m while transport block 1603 is sent at subframe #n, where m≠n. The subframe offsets m,n can either be explicitly indicated as part of RRC configuration or can be implicitly determined based on the triggering of the activation of the different SPS processes for these transport blocks.

Activation

For mode 1 operation, the SPS periodicity can be assigned by the eNodeB based on several factors, including the geo information transmitted by the UE. The SPS SL RNTI is pre-configured by the eNodeB during association. The SPS-periodicity and SPS-RNTI for SL can also be configured by the eNodeB using RRC using SPS-Config. The existing SPS-Config can be enhanced to additionally include the semi-persistent transmission configuration for the SL such as semiPersistSched-SL-RNTI (sps-SL-RNTI) and sps-ConfigSL. If SL-SPS is enabled, the PSCCH can be scrambled with the SPS-SL-RNTI for semi-persistent transmissions. After the UE is configured with SPS SL-RNTI, the UE is configured by higher layers to decode PSCCH with CRC scrambled by the SPS-SL-RNTI.

The UE transmits the PSCCH with CRC scrambled by the SPS-SL-RNTI. Any message scrambled by SPS-SL-RNTI is assumed to be a CAM message with semi-persistent transmissions.

In mode 1 operation, a UE shall monitor PSCCH with CRC scrambled by the SPS-SL-RNTI in every subframe. The set of RBs for semi-persistent transmission of PSSCH and PSCCH can be configured by the eNB using RRC for mode 1 operation. Once SPS is configured and enabled by the eNodeB, the SPS information such as the periodicity and number of SPS transmissions for implicit release can be transmitted in the SCI format in the PSCCH transmissions.

In embodiments of the present disclosure, the activation/release of each configuration is indicated in the DCI format of the (E)PDCCH transmissions. A few bits in one of the DCI format fields can be re-used for this purpose. TABLE 4 shows an example of using a few bits of the DCI format fields for activation of a SPS configuration. If C configurations are supported, at least ceil(log 2(C)) bits are needed for activation.

TABLE 4

| Value | Configuration |
| --- | --- |
| ... 000 | Activate configuration 0 |
| ... 001 | Activate configuration 1 |
| ... 010 | Activate configuration 2 |
| ... | ... |

A similar table can be used for release as well.

In embodiments of the present disclosure, simultaneous activation and release is supported for fast SPS switching between configurations, where release of one configuration activates another configuration. TABLE 5 shows an example of using few bits of the DCI format fields for simultaneous activation and release of a SPS configuration. If C configurations are supported, at least 2*ceil(log 2(C)) bits are needed for supporting simultaneous activation and release. If a current configuration is already active or released and is made active/released, there is no change. i.e. to activate a configuration without simultaneous release, simply release an already released (inactive) configuration. If the same configuration is made active and release simultaneously, it can be used to signify that the configuration is re-activated.

TABLE 5

| Activation | Release | Configuration |
| --- | --- | --- |
| ... 000 | ... 000 | Re-activate configuration 0 |
| ... 000 | ... 001 | Activate configuration 0, Release configuration 1 |
| ... 000 | ... 010 | Activate configuration 0, Release configuration 2 |
| ... | ... | |
| ... 001 | ... 000 | Activate configuration 1, release configuration 0 |
| ... 001 | ... 001 | Re-activate configuration 1 |
| ... 001 | ... 010 | Activate configuration 1 & release configuration 2 |
| ... 001 | ... 011 | Activate configuration 1 & release configuration 3 |
| ... | ... | ... |

In one example, the fields of the DCI format 5 used for sidelink are reconfigured to support SPS activation and release for V2V, as shown in TABLE 6, assuming the maximum number of SPS configurations for the UE is limited to 4 (2 bits).

TABLE 6

| Parameter | Bits | Usage |
| --- | --- | --- |
| Resource for PSCCH | 6 | N/A or set to '0' |
| TPC command | 1 | N/A or set to '0' |
| Resource block assignment and hopping resource allocation | 5-13 | All bits are set to '0' to indicate SPS activation/release |
| Frequency hopping flag | 1 | N/A or set to '0' |
| Time Resource Pattern (T-RPT) | 7 | Bits 6-4 is N/A or set to '0' Bits 3-2 is used for release Bits 1-0 is used for activation |

The initial resource selection can be provided by the eNodeB. The eNodeB assigns the SPS periodicity and resources for transmission of messages.

Resource Reselection

Resource reselection can be triggered based on the following conditions.

(a) The transmitting UE scans the resource pool every period P, unless it happens to be transmitting in that period. If there is a significant change in the resource pool (e.g., above a threshold), or the UE observes a potential conflict for its next transmission period, the UE reports the conflict to the eNodeB, which can then perform resource reselection.

(b) In mode 1 operation, the transmitting UE can report the status of the shared resource pool to the eNB based on a request from the eNB and the eNB may take several actions to assist resource allocation. For example, the eNB may stop the current SPS transmissions, reconfigure pool resources or request the UE to select a different set of RBs for future transmissions within the pool.

SPS Termination

SPS may be terminated by the eNodeB at any time. In addition, the SPS may be terminated by the eNB based on the following feedbacks (i)-(iii) from the UE.

(i) The UE indicates to the eNB that it does not intend to transmit data before a transmission associated to an SPS configuration. This could be indicated, for example, on the PUCCH.

(ii) The UE indicates to the eNB of a change in traffic periodicity and/or priority and/or change in geo-location zone in the PUSCH.

(iii) If the UE has no data to transmit, then the UE skips SPS transmission and increases an internal counter. If the number of counter is equal to the pre-determined threshold, then the UE releases the SPS and notifies the release to the eNB.

For mode 1, eNB can activate/re-activate/release SL SPS at any time for the UE transmissions.

Mode 2 Operation

Figure 17:
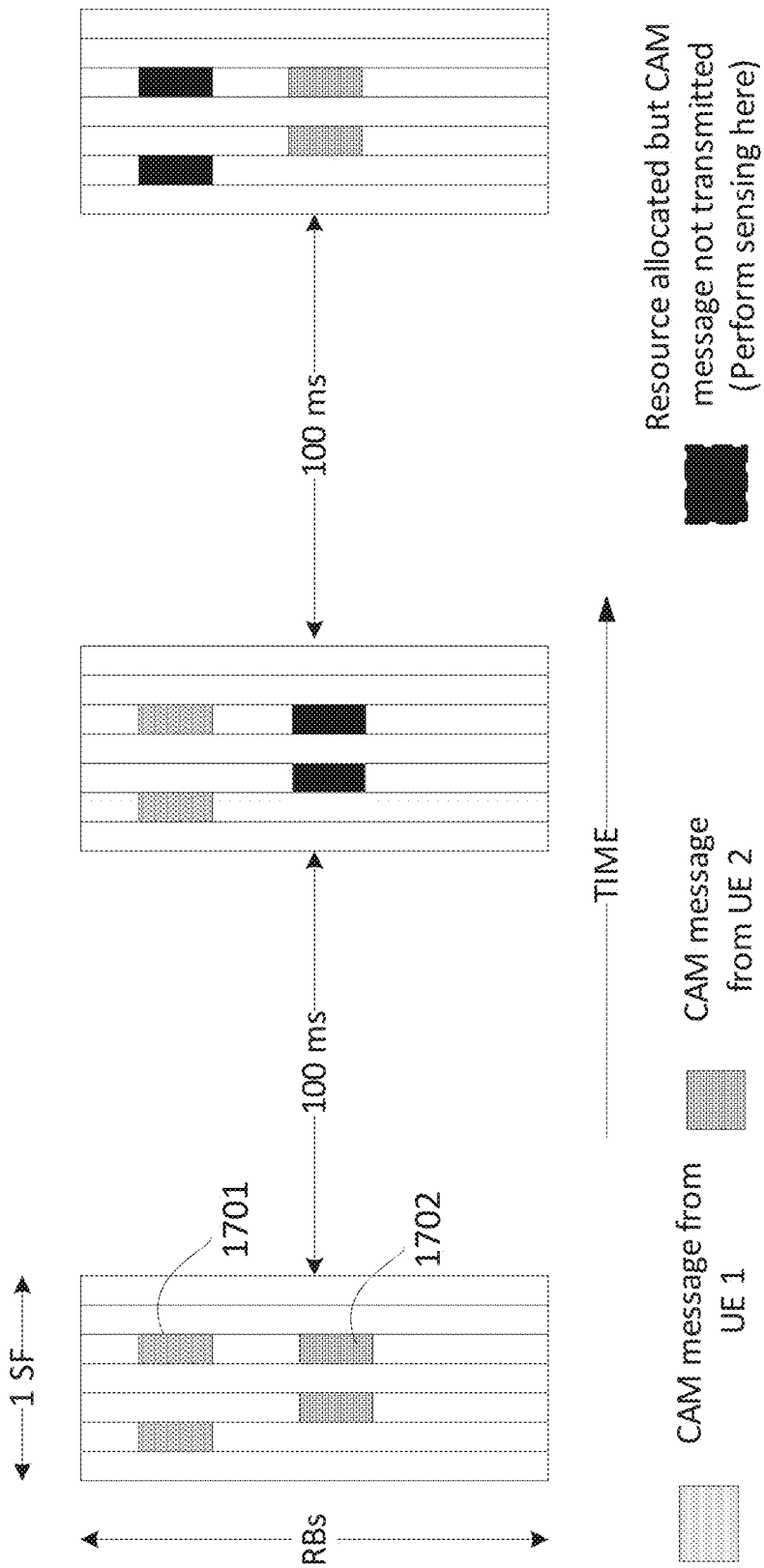
FIG. 17 shows an example of semi-persistent transmissions from multiple UEs in the shared resource pool for SL according to one embodiment of this disclosure.

FIG. 17 shows an example of semi-persistent transmissions from multiple UEs in the shared resource pool for SL according to one embodiment of this disclosure.

UE 1701 transmits its CAM messages in 2 symbols within a sub-frame (for example, if using FDM) or 2 sub-frames within a frame (for example, if using TDM). UE 1702 transmits its CAM messages such that in at least 1 time instance it can hear the transmissions from UE 1701. If the transmitting UE 1701 or 1702 does not have any CAM message to transmit at its next intended transmission time, it performs sensing on the set of potential resources it was intending to transmit on. This can allow the transmitting UE to make a better resource selection choice for future transmissions.

Activation

For mode 2 operation, the SPS periodicity can be implicitly assumed to a fixed value (for example, 100 ms). The SPS SL RNTI is pre-configured by the eNodeB during association. The UE transmits the PSCCH with CRC scrambled by the SPS-SL-RNTI. Any message scrambled by SPS-SL-RNTI is assumed to be a CAM message with semi-persistent transmissions.

The transmitting UE first scans the shared pool for K ($>=10$) periods (of periodicity $P>=100$ ms) to capture at least one CAM transmission from all neighboring UEs. Based on the scan results, the transmitting UE finds the occupancy pattern of the neighboring UEs and their SPS periodicity. The transmitting UE then selects SPS transmission resources according to the following criteria: (a) If at least 1 resource is available for all K periods in the scan, that is given first priority for transmission; (b) If at least 1 resource is available for L periods, where $1<L<K$, the UE selects a resource and SPS schedule that minimizes the collision with its periodicity; and (c) If no resource is available, the UE does not transmit and restarts resource selection.

Resource Reselection

Resource reselection can be triggered based on the following conditions (a) to (c): (a) The transmitting UE scans the resource pool every period P, unless it happens to be transmitting in that period. If there is a significant change in the resource pool (e.g., above a threshold) or the UE observes a potential conflict for its next transmission period, the UE performs resource reselection; (b) As increased resource utilization is observed (e.g. above a threshold), the transmitting UE can lower its SPS periodicity to accommodate more UEs and perform resource reselection; and (c) If there is a change required in the periodicity of the CAM message transmission of the transmitting UE due to change in UE speed/direction etc., the UE performs resource reselection.

SPS Termination

SPS may be terminated based on the following conditions: (a) The resource pool scan shows all resources are occupied; and (b) There is an emergency event for the transmitting UE.

In one embodiment of the present disclosure, when the CAM message periodicity changes due to change in vehicle speed, it cancels its current SPS reservation and performs resource reselection. In this case, it temporarily uses separate resources without SPS during the period where the speed is changing. After the speed is stabilized, it performs resource selection again and goes back to a periodic SPS transmission.

Figure 18:
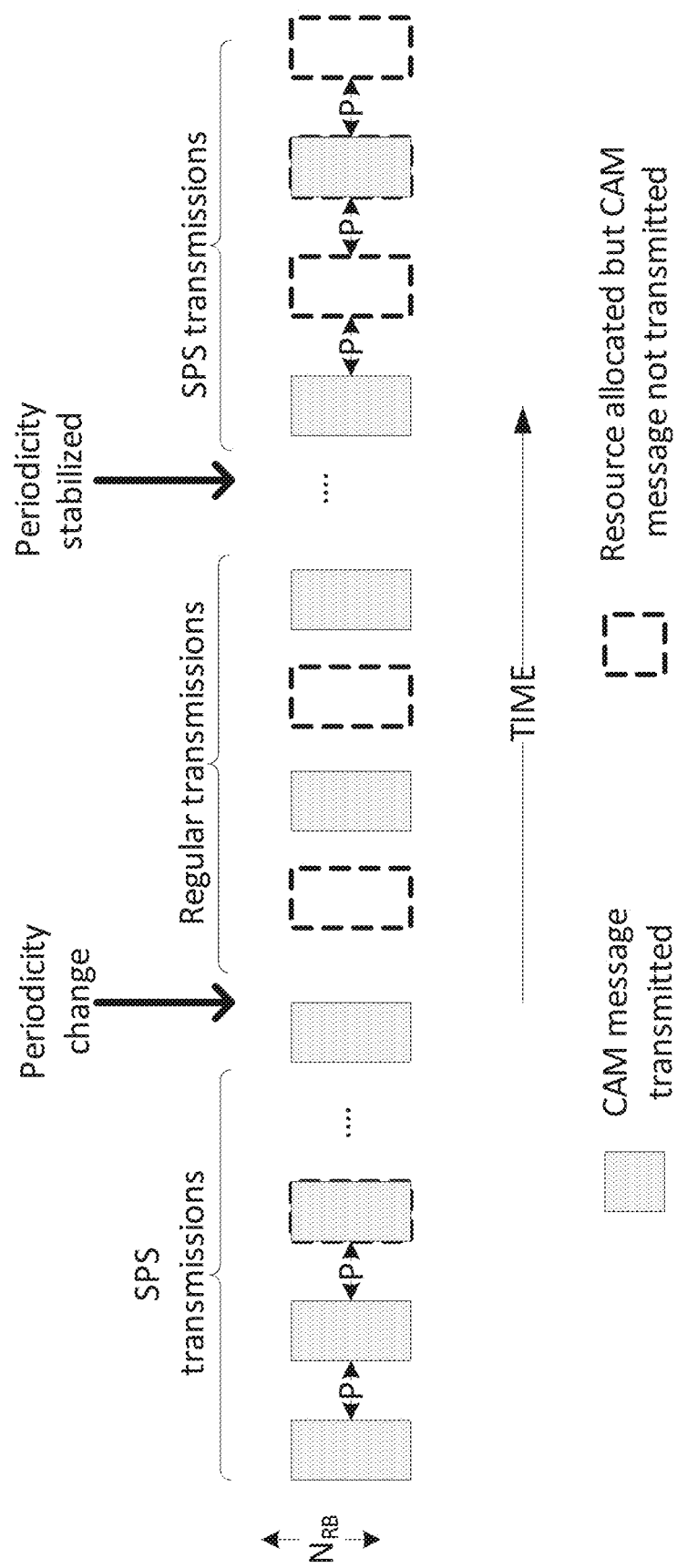
FIG. 18 shows an embodiment of the disclosure where the UE stops the SPS transmissions and changes to regular transmissions until the periodicity is stabilized.

FIG. 18 shows an embodiment of the disclosure where the UE stops the SPS transmissions and changes to regular transmissions until the periodicity is stabilized (based on observing the past few transmissions at regular periodicity). Once the periodicity has stabilized, the UE continues transmission with the new periodicity. The embodiments shown in FIG. 18 are for illustration only. Other embodiments could be used without departing from the scope of the present disclosure.

Figure 19:
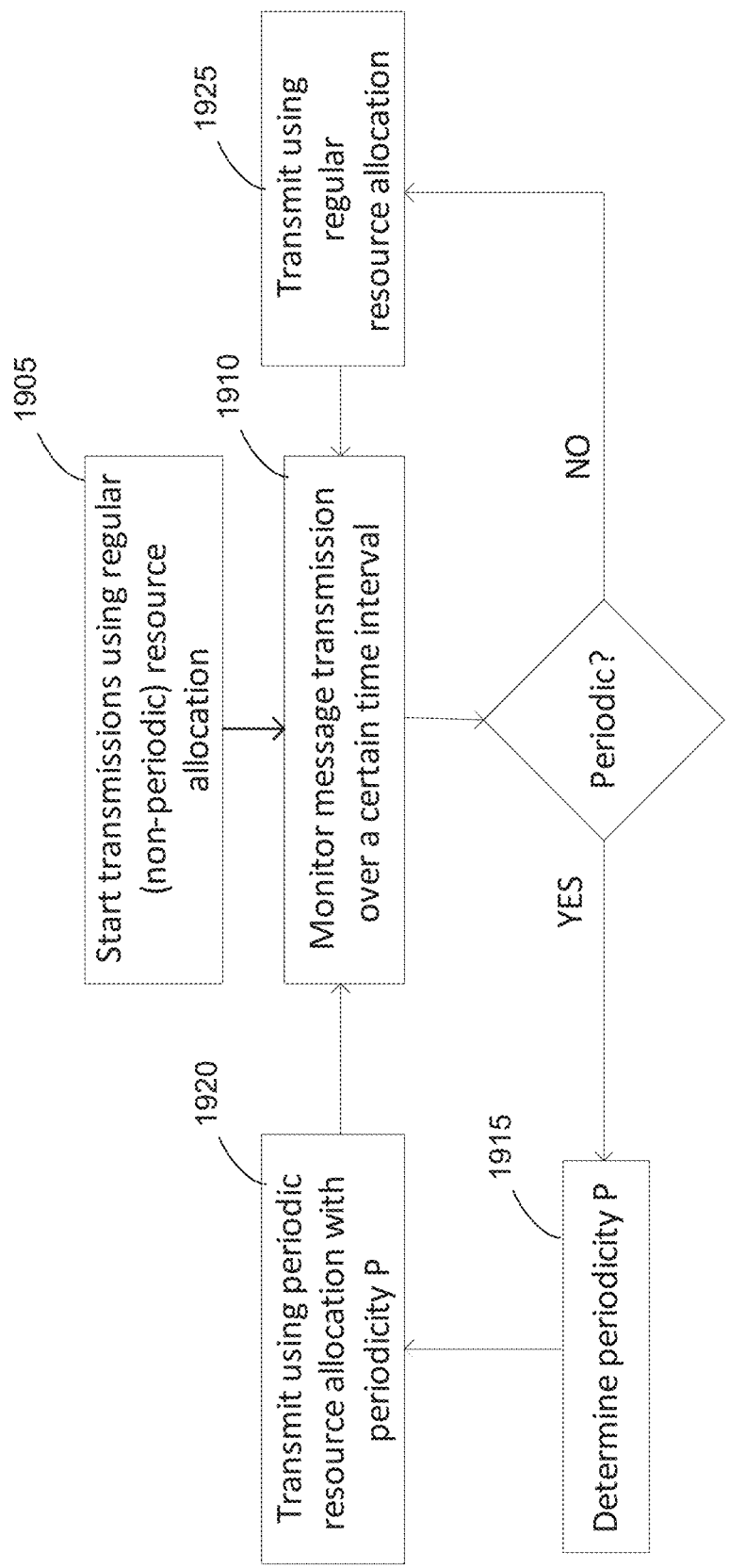
FIG. 19 shows an example procedure for transmitting messages using periodic and regular resource allocation, according to embodiments of the present disclosure.

FIG. 19 shows an example procedure for transmitting messages using periodic and regular resource allocation, according to embodiments of the present disclosure. The embodiments shown in FIG. 19 are for illustration only. Other embodiments could be used without departing from the scope of the present disclosure.

The UE first starts with a regular allocation in step 1905 and monitors its traffic generation pattern from the upper layers over a given time interval, say 1-10 seconds, for example in step 1910. If the traffic pattern is observed to be periodic with periodicity P within the given time interval, the UE assigns a periodic resource of periodicity P in step 1915 and transmit messages using periodic resource allocation with periodicity P in step 1920. As soon as there is a change in periodicity, the UE stops its periodic allocation and returns to a regular allocation in step 1925.

Figure 20:
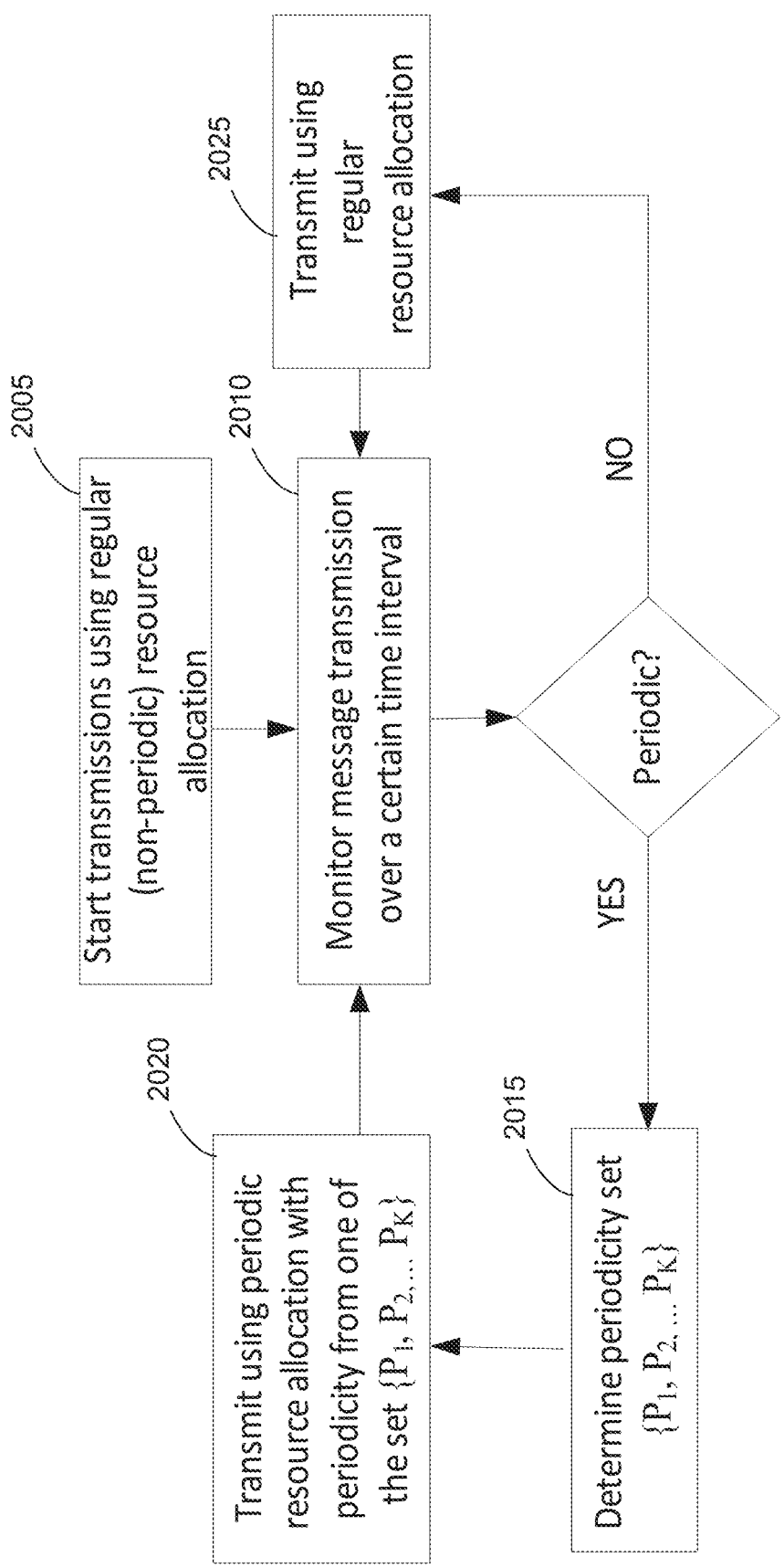
FIG. 20 shows another example procedure for transmitting messages using periodic and regular resource allocation, according to embodiments of the present disclosure.

FIG. 20 shows another example procedure for transmitting messages using periodic and regular resource allocation, according to embodiments of the present disclosure. The embodiments shown in FIG. 20 are for illustration only. Other embodiments could be used without departing from the scope of the present disclosure.

The UE first starts with a regular allocation in step 2005 and monitors its traffic generation pattern from the upper layers over a given time interval, say 1-10 seconds, for example in step 2010. To account for dynamic periodic variations, the periodicity is not determined precisely to P but from a set of periodicities {P1, P2, . . . , PK} in step 2015, where K is the maximum number of periodicities in the set. In one example, K=3 and the periodicities could be {P1, 2*P1, P1/2}. In this case, each transmission in the SPS could be the current periodicity or the next one (in both directions) in step 2020.

As soon as there is periodicity observed outside this set, the UE stops its periodic allocation and returns to a regular allocation instep 2025. The other UEs monitoring the resource pool may detect the periodic transmission of the UE for the purpose of resource selection/avoidance and in one alternative may only consider the currently transmitted periodicity in a period as occupied in upcoming periods.

In a second alternative, the monitoring UEs may additionally consider the resource allocation corresponding to other periodicities in the set as unavailable in upcoming periods. The set of periodicities may be implicitly indicated, for example by lookup table, preconfiguration, or fixed offset between periods (e.g. 2× or 0.5×, or +/−X ms or slots) or may be explicitly indicated by physical or higher layer signaling (e.g. in a SA or other dedicated SPS/resource allocation message).

Semi-Persistent Transmissions on the Uplink to the eNB

SPS configuration, activation and release procedures for UL can follow existing SPS procedures in Rel-13.

Distinguishing Message Types by Scrambling

In embodiments of the present disclosure, all periodic messages such as periodic CAM messages for V2V SL are scrambled by SPS-SL-RNTI while non-periodic messages such as DENM messages are scrambled by SL-RNTI. DENM messages, being aperiodic, do not use semi-persistent transmissions. However, DENM messages can have increased number of repetitions within frame or sub-frame to provide higher reliability.

In another embodiment of the invention, only periodic (CAM) messages use a shared resource pool while DENM messages use a dedicated resource pool. For example, the commTxPoolExceptional field in SIB18 can be re-used for DENM messages for V2V.

In another embodiment of the present disclosure, for V2I transmissions of aperiodic DENM messages, the DENM messages are transmitted using regular PUSCH transmissions and are scrambled by C-RNTI.

Performance Validation

Figure 21:
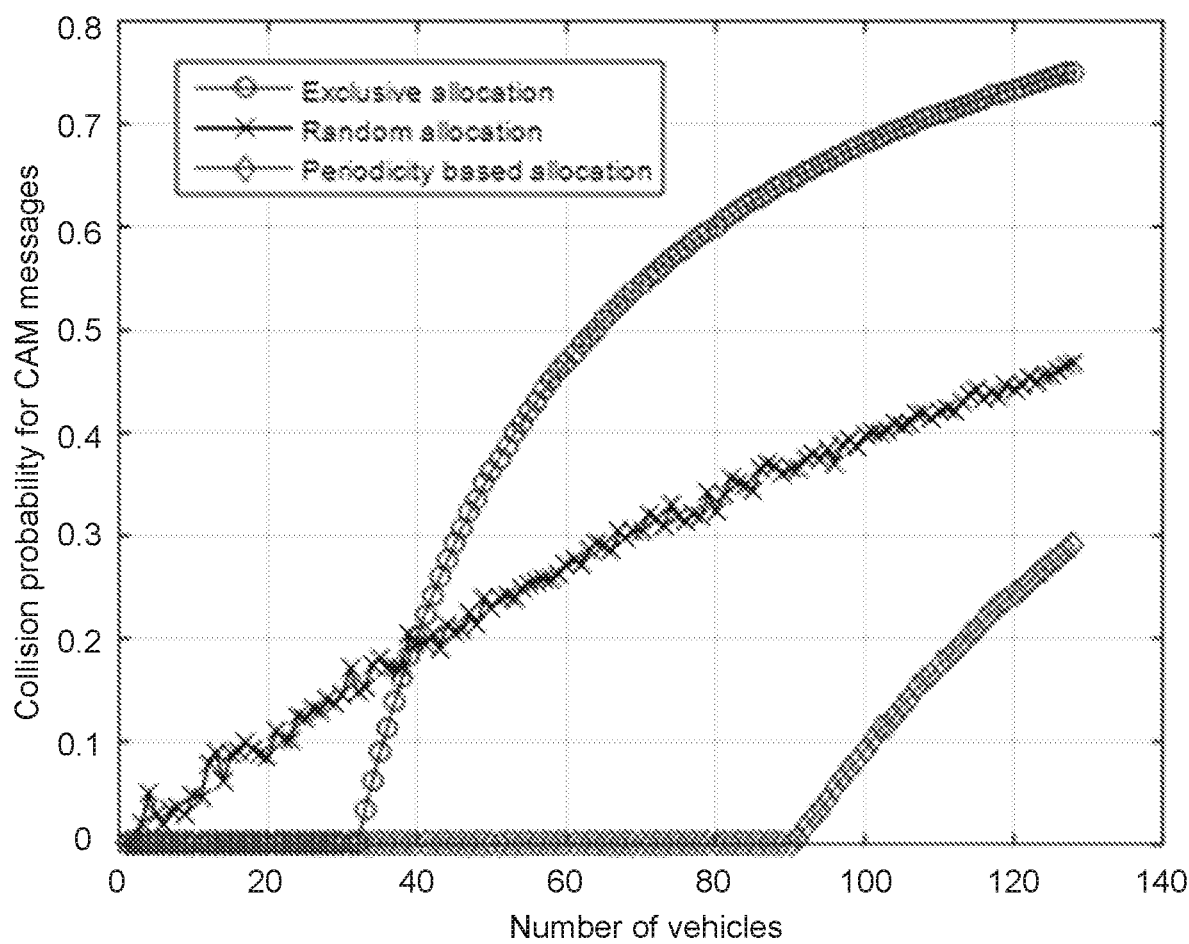
FIG. 21 illustrates an example of comparing the different SPS allocation schemes according to embodiments of the present disclosure.

FIG. 21 illustrates an example of comparing the different SPS allocation schemes according to embodiments of the present disclosure. The embodiments shown in FIG. 21 are for illustration only. Other embodiments could be used without departing from the scope of the present disclosure.

In this example, we assume up to 32 exclusive resources are available for SPS transmissions. The UEs are assumed to be transmitting 3-5 messages per second for speeds between 40-75 km/hr on a freeway. As can be observed, when the number of UEs in the resource set is less than 32, exclusive allocation works fine with no collisions. However, periodicity based allocation allows ~90 UEs to be allocated due to the ability to multiplex SPS resources in the pool. Random allocation is worse when number of UEs <32 but is better than exclusive allocation when number of UEs get large.

Figure 22:
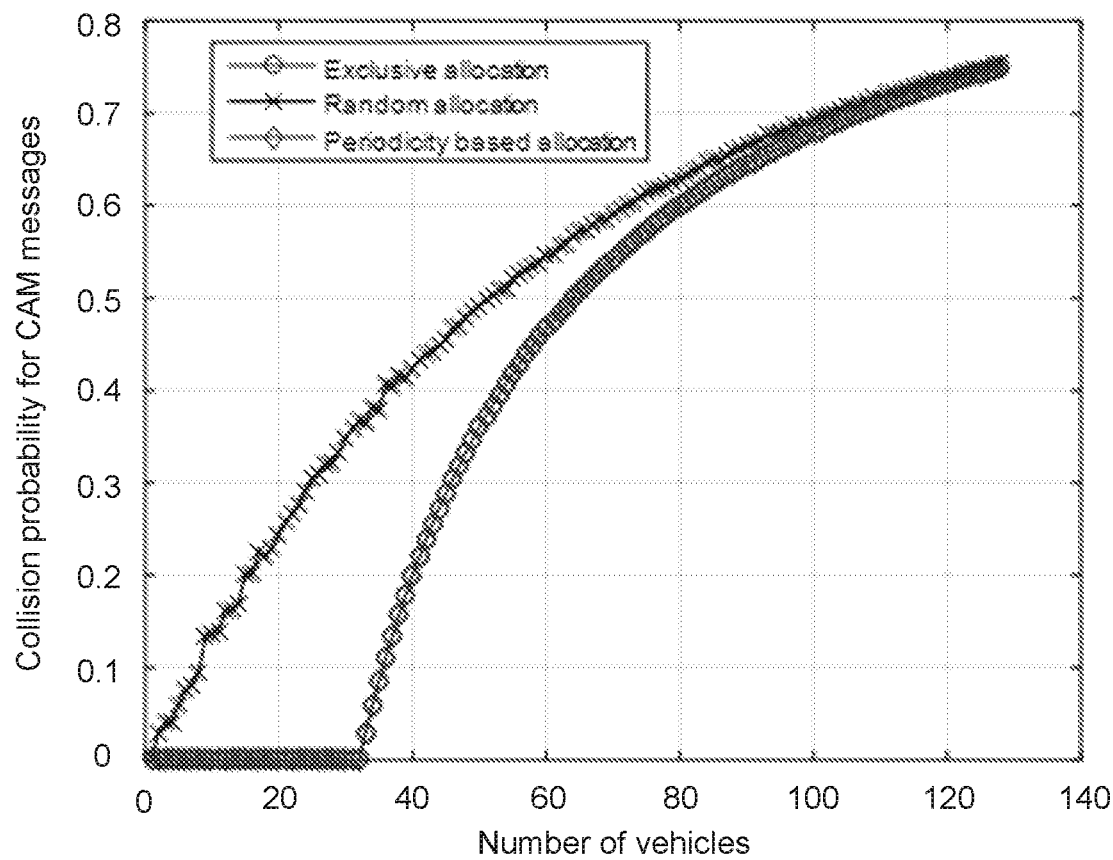
FIG. 22 shows another example of comparing the different SPS allocation schemes according to embodiments of the present disclosure.

FIG. 22 shows another example of comparing the different SPS allocation schemes according to embodiments of the present disclosure. The embodiments shown in FIG. 22 are for illustration only. Other embodiments could be used without departing from the scope of the present disclosure.

This example shows an extreme case when all UEs are transmitting 10 messages per second. In this case, there is no performance benefit of periodicity based allocation since there are no UEs available to multiplex as all UEs are transmitting at 100 ms periodicity.

Figure 23:
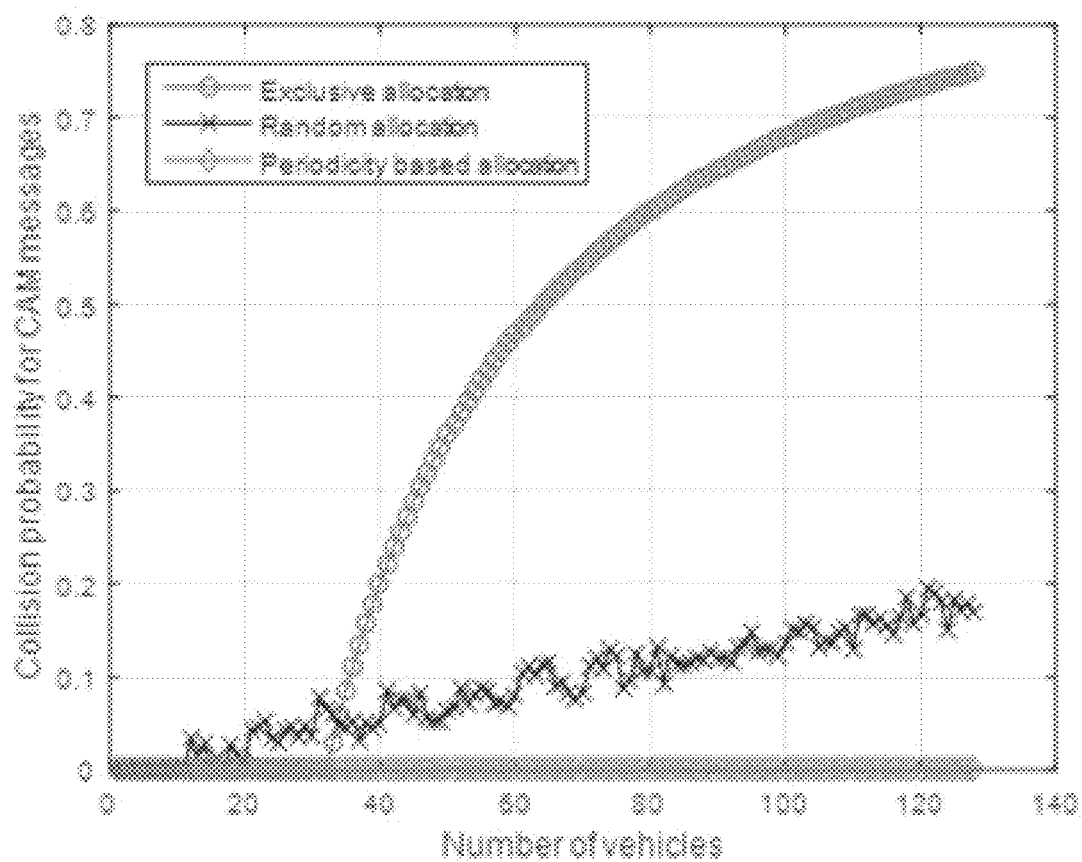
FIG. 23 shows yet another example of comparing the different SPS allocation schemes according to embodiments of the present disclosure.

FIG. 23 shows yet another example of comparing the different SPS allocation schemes according to embodiments of the present disclosure. In this example, if the UEs are transmitting only 1 message/sec (for example, at stop sign), the periodicity based allocation shows significant gains and no collisions are observed.

Since low latency is a critical feature for V2V communication, the current D2D structure where the PSCCH and PSSCH are scheduled across multiple sub-frames in separate resource pools and are time-multiplexed cannot meet the requirements for V2V communication. In the present disclosure, we provide resource pool designs for fast resource allocation, support for semi-persistent scheduling for periodic traffic and support for scheduling emergency DENM event-triggered traffic.

Resource Pool Design

Figure 24:
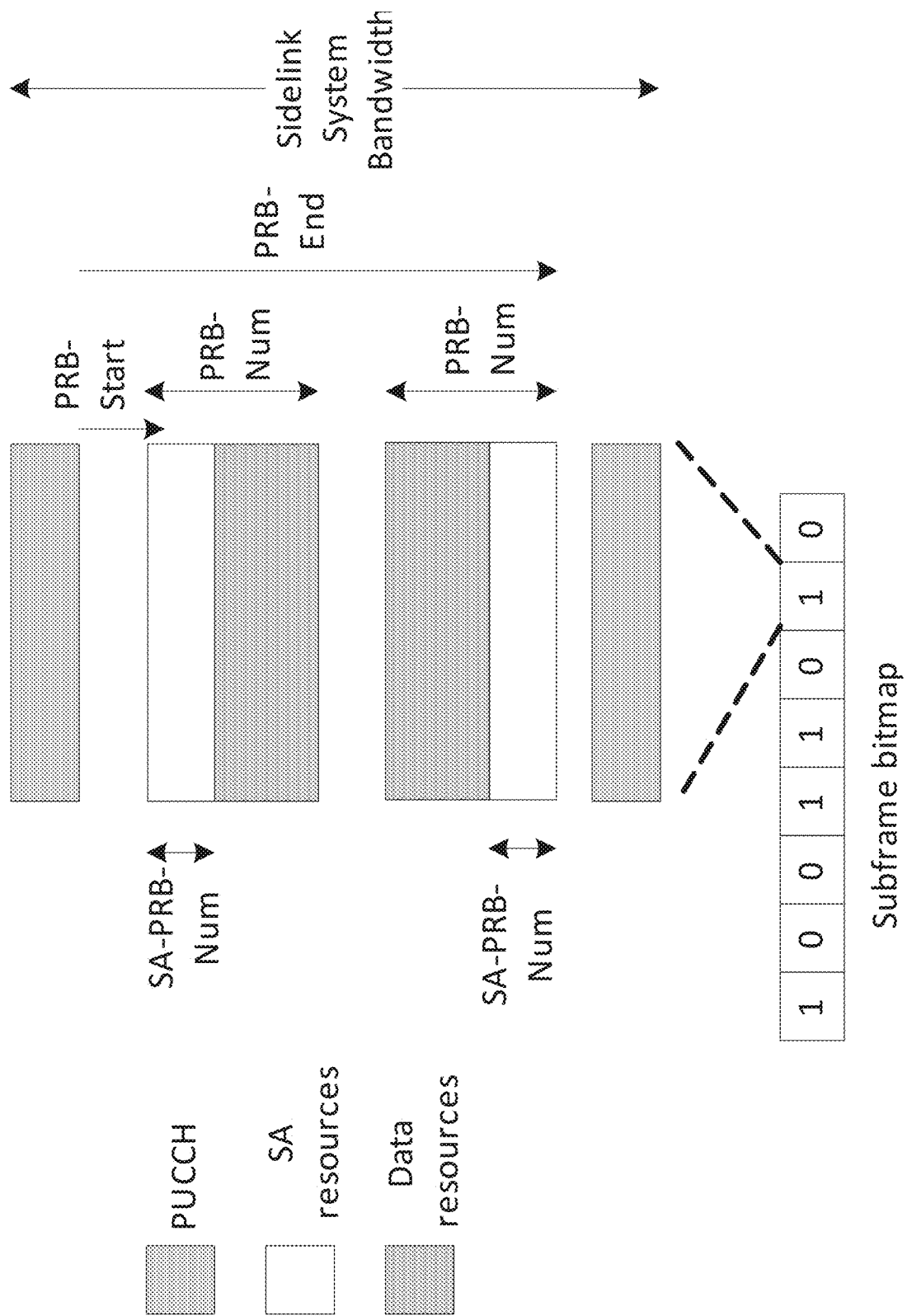
FIG. 24 illustrates an example resource pool structure using frequency division multiplexing of SA and data according to illustrative embodiments of the present disclosure.

FIG. 24 illustrates an example resource pool structure using Frequency Division Multiplexing of SA (PSCCH) and Data (PSSCH) according to illustrative embodiments of the present disclosure. The embodiments shown in FIG. 24 are for illustration only. Other embodiments could be used without departing from the scope of the present disclosure.

Figure 25:
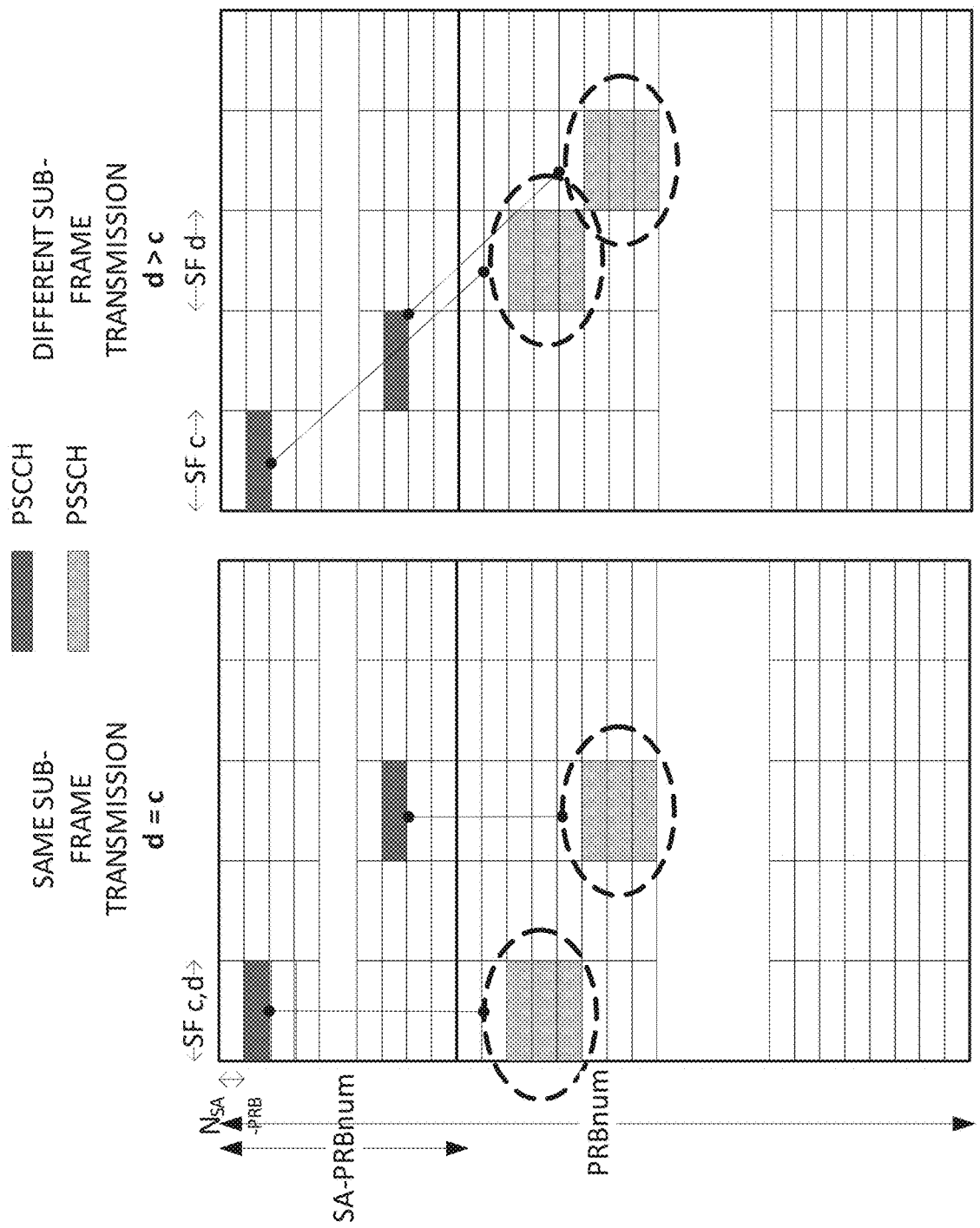
FIG. 25 illustrates example resource pool structures using frequency division multiplexing of SA and data on separate physical channels according to illustrative embodiments of the present disclosure.

The resource pool for V2V communication is defined as follows: (a) in frequency: by parameters, PRBnum that defines the frequency range in Physical Resource Block (PRB) bandwidth units; PRB start and PRBend, which define the location in the frequency domain within the uplink band; SA-PRBnum that defines the frequency range in Physical Resource Block (PRB) bandwidth units that is assigned for SA (PSCCH) transmission and reception. SA-PRBnum is less than or equal to PRBnum. The SA frequency bands are defined starting from PRB start or PRBend, depending on which of the two bands are in use in the current slot. (b) in the time domain: by a bitmap that indicates the 1 msec sub-frames used for PSCCH and PSSCH transmissions FIG. 25 illustrates example resource pool structures using frequency division multiplexing of SA and data on separate physical channels according to illustrative embodiments of the present disclosure. The embodiments shown in FIG. 25 are for illustration only. Other embodiments could be used without departing from the scope of the present disclosure.

The SA and data resources are orthogonal in frequency i.e. separate without any overlap. This helps the receiver to look for SA in a particular set of frequency locations without having to search through the entire band. The resources used for each SA transmission is fixed in frequency. The resource location for SA transmission of each UE within a resource pool is indicated by the eNodeB in the DCI format for mode 1 transmission.

In some embodiments, the SA transmission may be repeated multiple times within the resource pool to provide improved reliability and to support half-duplex transmissions. At least in the UE autonomous resource selection mode (mode 2), PSCCH shall be transmitted for every PSSCH transmission. In case of re-transmissions also, PSCCH should be repeated in the autonomous mode since it is possible that the receiving UE may have missed the PSCCH transmission due to half-duplex issue. Repetitions of PSSCH and PSCCH, if any, are scheduled within a fixed transmission period.

In case of repetitions in mode 1, when soft combining is required to increase reliability, the repetition information can be implicitly obtained from the location of the first transmission indicated by the eNodeB using a mapping rule. The number of repetitions or re-transmissions can be configured by the eNB or can be pre-determined. Also, in cases, where eNB support is not available, PSBCH transmissions can be used to configure the number of re-transmissions, for example, by using a bit in the Master Information Block for Sidelink (MIB-SL).

For example, the number of repetitions may be increased to improve reliability under high speed conditions or based on geo-location. The number of repetitions can also be increased to provide higher reliability to support high priority traffic such as emergency messages.

In embodiments of the present disclosure, high Doppler is supported by increasing the number of repetitions for PSSCH and/or PSCCH. In one example, configuration of repetitions is switched between 2 repetitions and 4 repetitions, which is decided by the eNB and configured via RRC signaling and/or configuring a bit in the PSBCH transmissions to provide this distinction.

The SA contains explicit information about the frequency location of data transmission(s) to provide increased flexibility for scheduling resources. This is required since the message can be of variable size and may use variable modulation and coding rates, which makes the amount of resources used in frequency variable. The data can be composed of multiple duplicate transport blocks for increased reliability. Thus, PSSCH and PSCCH are transmitted simultaneously with separate DFT preceding within the same sub-frame and are not contiguous in frequency.

Each PSCCH and PSSCH should be transmitted at least twice to solve the half-duplex issue. In this case, it is important that multiple UEs do not select the same offset for repetition(s) with respect to their first transmission. One method to solve this issue would be to require that the transmission of the repetition(s) of PSSCH and PSCCH be in a random time offset with respect to their first transmissions. If a PSSCH transmission is sent over multiple sub-frames, the transmission time of those sub-frames are also randomized.

In embodiments of the present disclosure, multiple resource allocation modes are supported for PSSCH transmission:
   (a) Distributed resource group allocation: i. This mode is similar to Type-0 mode used for DL resource allocation; and ii. This mode can be used for autonomous mode 2 operation, for example, to reduce sensing and resource allocation requirements. It can also help provide frequency diversity and increased transmission power.

(b) Continuous allocation: i. This mode is similar to Type-2 mode used for DL resource allocation and ii. This mode can be used for mode-1 operation, for example, and can give lower MPR (c) Interlaced allocation: i. This mode is based on the interlacing based resource allocation used for UL LAA; ii. This mode can be used to support co-existence with DSRC in certain geographical locations and/or in certain shared frequency bands; iii. The PSCCH is always transmitted in the same subframe as PSSCH in the interlaced allocation mode. The entire carrier bandwidth is used for transmission in this mode. The PSCCH also follows the interlace pattern of the PSSCH, if applicable; and iv. This method can provide frequency diversity for transmission and also benefit sensing in Mode 2 where a signal can be observed with periodicity across the resource.

The allocation mode can be configured by the eNB. All UEs in a given resource pool shall use the same allocation mode.

Figures 26A, 26B, 26C:
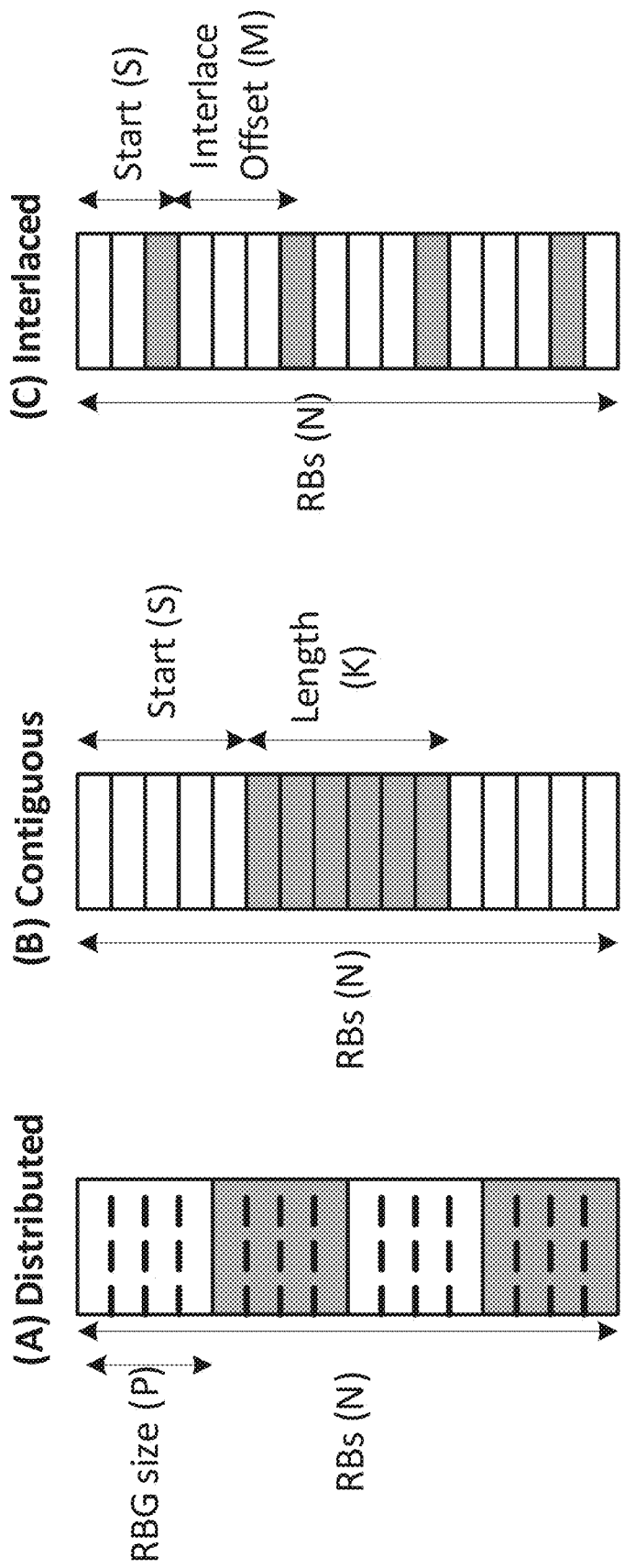
FIG. 26A to 26C illustrate the resource allocations for Physical Sidelink Shared Channel (PSSCH) transmissions according to embodiments of the present disclosure.

FIGS. 26A to 26C illustrate the resource allocations for PSSCH transmissions according to embodiments of the present disclosure. The embodiments shown in FIGS. 26A to 26C are for illustration only. Other embodiments could be used without departing from the scope of the present disclosure.

FIG. 26A shows a distributed resource allocation mode, where resources are allocated in groups of RBs of size P. A bit map is used to indicate the groups that are used, requiring a total of ceil(N/P) bits in the PSCCH for indicating the resources used for transmission. The RBG size P can be fixed and can be a function of the sidelink transmission bandwidth. If the amount of data to be transmitted requires less than P resources, rate matching is performed to utilize the entire RB group size P.

FIG. 26B shows a contiguous resource allocation mode, where the resources are signaled in terms of a starting position S and number of RBs used K. PRB allocations in this mode can vary from a single PRB to a maximum number, spanning the entire SL bandwidth. This requires an indication using ceil(log 2(N(N+1))) bits in the PSCCH.

FIG. 26C shows an interlaced resource allocation mode where the resources are interlaced across the bandwidth. The resources are indicated by a starting position (S) and the interlace offset (M). Multiple interlaces can also be supported with different starting positions.

DSRC Co-Existence Support

A. V2V Transmission Behaviour for Co-Existence with DSRC

There can be multiple approaches to enable detection of V2V transmissions by DSRC.

Figure 27:
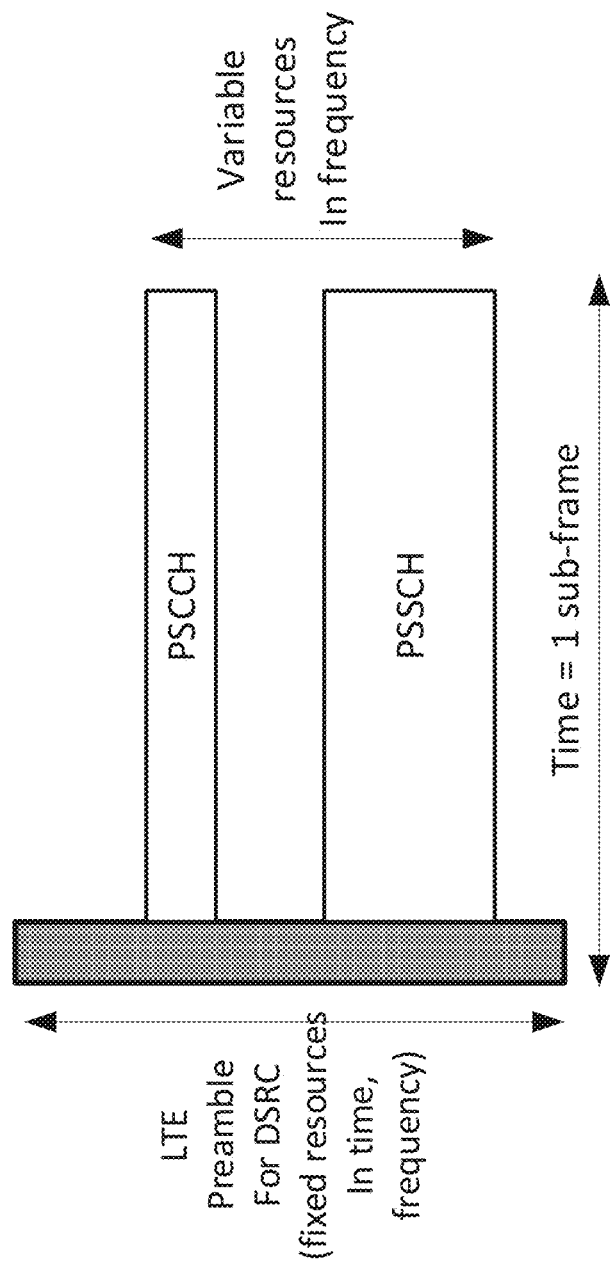
FIG. 27 illustrates an example periodic preamble that can be transmitted by V2V in order to facilitate detection by Dedicate Short Range Communication (DSRC) receivers according to embodiments of the present disclosure.

Option 1: Transmission of a Periodic Preamble that can be Detected by DSRC Receivers FIG. 27 illustrates an example periodic preamble that can be transmitted by V2V in order to facilitate detection by DSRC receivers according to embodiments of the present disclosure. 26A to 26C While different UEs may use different resources for PSCCH and PSSCH, they use the same resource for the preamble. The preamble is SFN accumulated, assuming all UEs transmit the same preamble.

Option 2: Wideband Transmissions Enabling CS/CCA at DSRC Receivers

Figure 28:
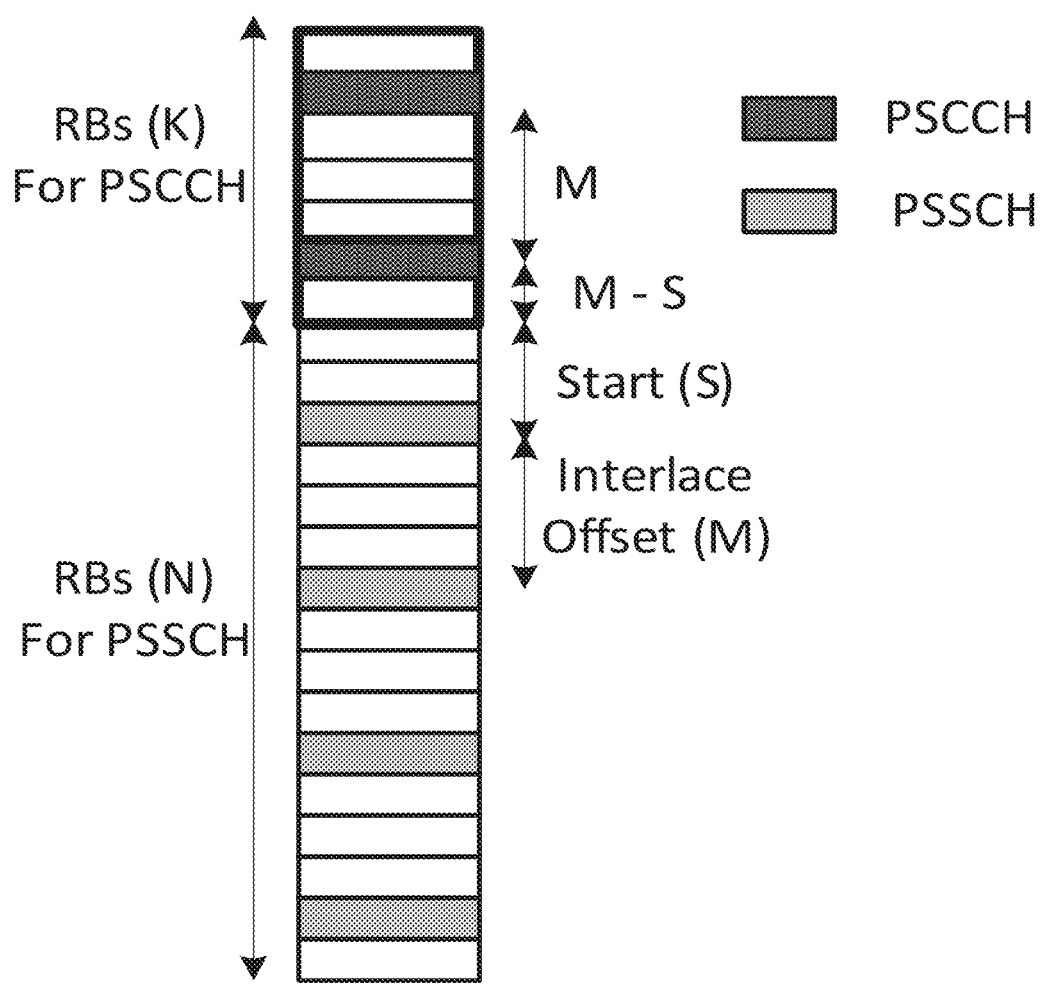
FIG. 28 shows an option using wideband transmissions to enable carrier sense/clear channel assessment at DSRC receivers according to embodiments of the present disclosure.

FIG. 28 shows an option using wideband transmissions to enable carrier sense/clear channel assessment (CS/CCA) at DSRC receivers according to embodiments of the present disclosure.

In this scheme, a multi-cluster transmission with a fixed interlace pattern is used for PSSCH and PSCCH transmissions. This allows the transmitter to meet bandwidth occupancy requirements (and higher transmit power in certain regulations) and supports multiplexing of UEs in the bandwidth with frequency diversity across the band. In this case, DSRC receivers may not be able to distinguish LTE V2V vs. another DSRC transmission purely based on CS/CCA but may be able to differentiate based on DSRC preamble detection.

In embodiments of the present disclosure, the RBs assigned for PSCCH transmissions follow the same interlace pattern as the PSSCH. If the number of RBs allocated for PSCCH exceed the interlace offset M, the PSCCH is repeated in sub-frame to follow the interlace pattern as shown in FIG. 28. It is allowed to perform rate matching in the interlace in case of insufficient data size.

B. V2V Reception Behaviour to Co-Exist with DSRC

Listen-before-talk (LBT) based approaches can be used for V2V reception behaviour to co-exist with DSRC. V2V devices can first perform an energy scan over the entire shared channel bandwidth before transmitting. A CS/CCA procedure with parameters defined to meet regulatory constraints for shared channel operation to support co-existence can be adopted. DSRC signals can be differentiated with LTE V2V signals based on SA and energy sensing features agreed for LTE V2V. When a DSRC signal is detected, V2V devices may stop V2V transmissions and report the detection of a DSRC transmission to the eNB at the earliest available opportunity. The eNB may then take the necessary action, such as evaluating a different channel for V2V transmissions. It is also possible for the eNB to perform the sensing as well.

Figure 29:
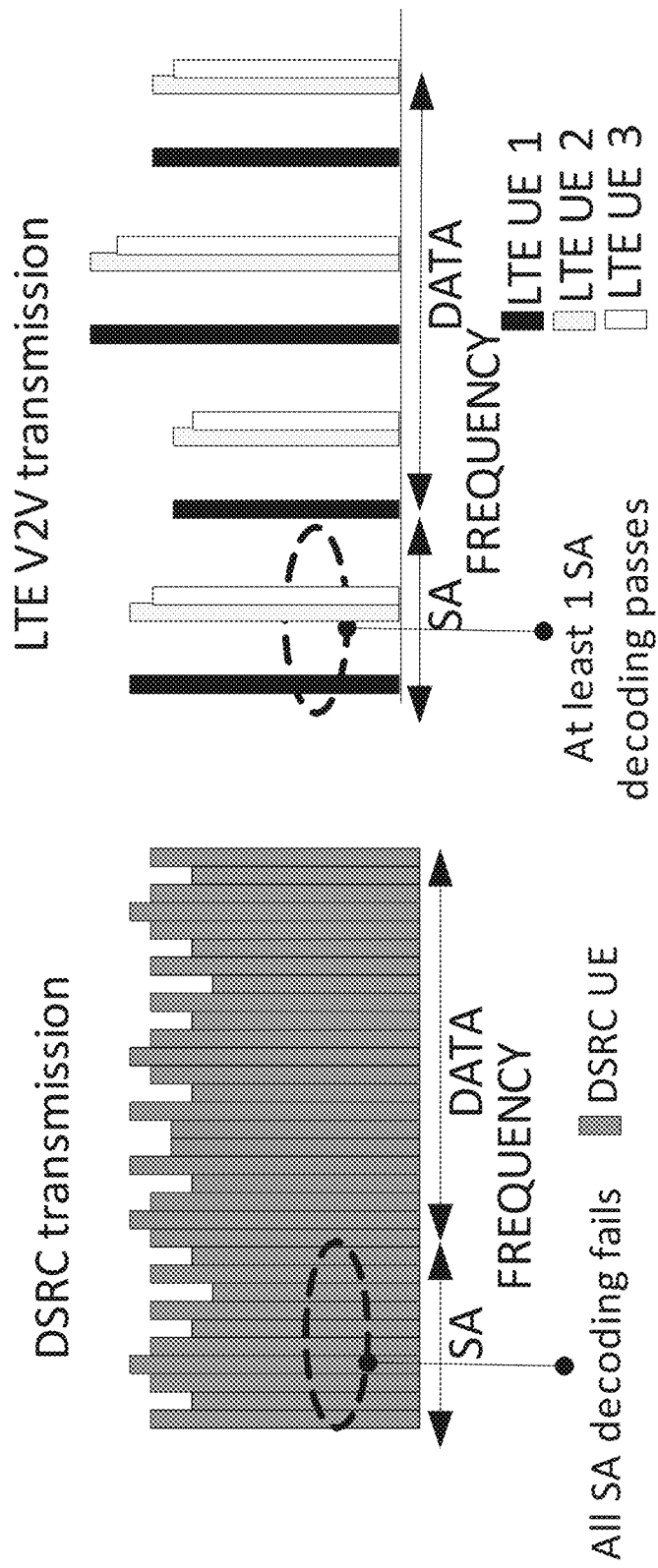
FIG. 29 shows how a V2V receiver can distinguish between a DSRC transmission and a LTE V2V transmission, according to the embodiments of this disclosure.

FIG. 29 shows how a V2V receiver can distinguish between a DSRC transmission and a LTE V2V transmission, according to the embodiments of this disclosure. A DSRC transmission is full bandwidth and cannot be decoded by the V2V receiver. In this case, the LTE receiver assumes that this is a DSRC transmission and takes the necessary action. On the other hand, a V2V transmission is interlaced in frequency and the control (SA) can be detected by the V2V receiver to identify it is a LTE V2V transmission and hence, no action needs to be taken regarding co-existence.

PSCCH Contents

The PSCCH contents are as shown in below TABLE 7.

TABLE 7

| Parameter | Usage |
| --- | --- |
| Resource for PSCCH | Provides the information of the transmitting UE of the resource to be used for SCI format 0 transmissions within the PSCCH pool. |
| Transmit power | The transmit power used for transmission of PSSCH |
| Resource block assignment | give to the receiving devices the information of the resources of the PSSCH that they shall decode in the frequency domain |
| Time offset indication | Indicates the time offset between the PSSCH and PSCCH based on an allowed configuration range |
| Number of repetitions | Indicates number of repetitions used for PSSCH |
| UE ID | The ID of the transmitting device |

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an example embodiment, various changes and modifications may be suggested to one skilled in the art. It is intended that the present disclosure encompass such changes and modifications as fall within the scope of the appended claims.

What is claimed:

1. A method for a user equipment (UE) in a wireless communication network, the method comprising:
   receiving, from a base station, configuration information on two or more semi-persistent scheduling (SPS) configurations for a sidelink transmission, wherein each of the two or more SPS configurations includes an SPS configuration index for the respective one of the SPS configurations and an SPS interval;
   receiving, from the base station, first control information indicating an activation or a release of one of the two or more SPS configurations and including an SPS configuration index for the one of the two or more SPS configurations;
   transmitting, on a physical sidelink control channel (PSCCH), second control information including a scheduling assignment for the sidelink transmission based on the configuration information and the first control information; and
   transmitting, on a physical sidelink shared channel (PSSCH), sidelink data for the sidelink transmission based on the second control information,
   wherein the second control information includes a time gap between initial transmission and retransmission of the second control information and the sidelink data, and
   wherein a resource for the scheduling assignment and a resource for the sidelink data are separated in a frequency domain or in a time domain.

2. The method of claim 1, wherein the first control information comprises downlink control information (DCI) in DCI format 5A transmitted on a physical downlink control channel (PDCCH).

3. The method of claim 1, wherein the configuration information is received via RRC signaling.

4. A user equipment (UE) in a wireless communication network, the UE comprising:
   a transceiver; and
   a controller configured to:
      receive, via the transceiver, from a base station, configuration information on two or more semi-persistent scheduling (SPS) configurations for a sidelink transmission, wherein each of the two or more SPS configurations includes an SPS configuration index for the respective one of the SPS configurations,
      receive, via the transceiver, from the base station, first control information indicating an activation or a release of one of the two or more SPS configurations and including an SPS configuration index for the one of the two or more SPS configurations,
      transmit, via the transceiver, on a physical sidelink control channel (PSCCH), second control information including a scheduling assignment for the sidelink transmission based on the configuration information and the first control information, and
      transmit, via the transceiver, on a physical sidelink shared channel (PSSCH), sidelink data for the sidelink transmission based on the second control information,
   wherein the second control information includes a time gap between initial transmission and retransmission of the second control information and the sidelink data, and
   wherein a resource for the scheduling assignment and a resource for the sidelink data are separated in a frequency domain or in a time domain.

5. The UE of claim 4, wherein the first control information comprises downlink control information (DCI) in DCI format 5A transmitted on a physical downlink control channel (PDCCH).

6. The UE of claim 4, wherein the configuration information is received via RRC signaling.

* * * * *